US008964664B2

(12) United States Patent
Hu et al.

(10) Patent No.: US 8,964,664 B2
(45) Date of Patent: Feb. 24, 2015

(54) SYSTEM AND METHOD FOR ASSOCIATION AND UPLINK ADAPTATION IN A RELAY NETWORK

(75) Inventors: Rose Qingyang Hu, Allen, TX (US); Yi Yu, Irving, TX (US); Zhijun Cai, Euless, TX (US); James Womack, Bedford, TX (US); Yi Song, Plano, TX (US); Chandra S. Bontu, Nepean (CA); Mo-Han Fong, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 462 days.

(21) Appl. No.: 13/389,563

(22) PCT Filed: Aug. 12, 2010

(86) PCT No.: PCT/US2010/045328
§ 371 (c)(1),
(2), (4) Date: Oct. 26, 2012

(87) PCT Pub. No.: WO2011/019919
PCT Pub. Date: Feb. 17, 2011

(65) Prior Publication Data
US 2013/0077506 A1   Mar. 28, 2013

Related U.S. Application Data

(60) Provisional application No. 61/233,429, filed on Aug. 12, 2009.

(51) Int. Cl.
*H04W 4/00* (2009.01)
*H04W 72/08* (2009.01)
(Continued)

(52) U.S. Cl.
CPC ........ *H04W 72/085* (2013.01); *H04W 72/0473* (2013.01); *H04W 24/00* (2013.01); *H04W 72/04* (2013.01); *H04W 88/04* (2013.01)
USPC .......................................... 370/329

(58) Field of Classification Search
CPC ..... H04W 16/14; H04W 92/20; H04W 16/10; H04B 17/005; H04B 17/0077; H04B 7/2606
USPC ................. 370/465, 343, 329, 332; 455/63.1, 455/67.11
See application file for complete search history.

(56) References Cited

U.S. PATENT DOCUMENTS

RE41,655 E *   9/2010   Woodhead et al. ........... 455/522
8,229,362 B2 *  7/2012   Hariharan et al. ........... 455/63.1
(Continued)

FOREIGN PATENT DOCUMENTS

CN   1371581 A   9/2002
CN   1717886 A   1/2006
(Continued)

OTHER PUBLICATIONS

PCT International Preliminary Report on Patentability; Application No. PCT/US2010/45328; May 25, 2012; 5 pages.
(Continued)

*Primary Examiner* — Raj Jain
(74) *Attorney, Agent, or Firm* — Conley Rose, P.C.; J. Robert Brown, Jr.

(57) ABSTRACT

In a system for allocating resources of a wireless communication system power levels of downlink (DL) communication channels and coupling losses of uplink (UL) communication channels are determined. When the power level of the DL communication channel between a base station and a UA is greater than the power levels of the DL communication channels between each of a plurality of RNs and the UA, and the coupling losses of the UL communication channel between at least one of the RNs and the UA are less than the coupling losses of the UL communication channel between the base station and the UA, a DL communication channel resource on the base station to the UA, and a UL communication channel resource on the at least one of the plurality of RNs to the UA are allocated.

21 Claims, 17 Drawing Sheets

(51) Int. Cl.
*H04W 72/04* (2009.01)
*H04W 24/00* (2009.01)
*H04W 88/04* (2009.01)

(56) References Cited

U.S. PATENT DOCUMENTS

| | | | |
|---|---|---|---|
| 2003/0021243 | A1 | 1/2003 | Hamalainen |
| 2004/0100911 | A1 | 5/2004 | Kwan et al. |
| 2004/0176027 | A1 | 9/2004 | O'Neill |
| 2007/0015461 | A1 | 1/2007 | Park et al. |
| 2008/0075059 | A1* | 3/2008 | Kermoal et al. ............ 370/343 |
| 2008/0084848 | A1 | 4/2008 | Jard et al. |
| 2008/0207122 | A1 | 8/2008 | Ahn et al. |
| 2008/0285499 | A1 | 11/2008 | Zhang et al. |
| 2009/0053994 | A1 | 2/2009 | Senarath et al. |
| 2009/0092072 | A1 | 4/2009 | Imamura et al. |
| 2009/0181712 | A1 | 7/2009 | Xu |

FOREIGN PATENT DOCUMENTS

| | | |
|---|---|---|
| CN | 101018093 A | 8/2007 |
| CN | 101141157 A | 3/2008 |
| CN | 101237259 A | 8/2008 |
| WO | 0101720 A1 | 1/2001 |

OTHER PUBLICATIONS

Chinese Office Action as Received in Co-pending Application No. 201080045954.4 on Apr. 4, 2014; 8 pages (No English translation available).

Chinese Office Action as Received in Co-pending Application No. 201080045955.9 on Mar. 5, 2014; 7 pages (No English translation available).

Hu, Rose Qingyang, et al.; U.S. Appl. No. 13/389,791, filed Feb. 9, 2012; Title: System and Method for Modulation and Coding Scheme Adaptation and Power Control in a Relay Network.

PCT International Search Report; PCT/US2010/045337; Oct. 13, 2010; 2 pages.

PCT Written Opinion of the International Searching Authority; PCT/US2010/045337; Oct. 13, 2010; 8 pages.

Canadian Office Action; Application No. 2,770,701; Feb. 26, 2013; 3 pages.

PCT International Search Report; Application No. PCT/US2010/045328; Oct. 13, 2010; 2 pages.

PCT Written Opinion of the International Searching Authority; Application No. PCT/US2010/045328; Oct. 13, 2010; 5 pages.

Chinese Office Action; Application No. 201080045954.4; Nov. 11, 2013; 20 pages.

Canadian Office Action; Application No. 2,770,701; Dec. 30, 2013; 3 pages.

Chinese Office Action; Application No. 201080045954.4; Jul. 23, 2014; 16 pages.

European Extended Search Report; Application No. 10808764.4; Nov. 4, 2014; 10 pages.

Chinese Office Action as Received in Co-pending Application No. 201080045954.4 on Dec. 18, 2014; 7 pages.

* cited by examiner

SYSTEM AND METHOD FOR ASSOCIATION AND UPLINK ADAPTATION IN A RELAY NETWORK

CROSS REFERENCE

This application is a filing under 35 U.S.C. 371 of International Application No. PCT/US2010/045328 filed Aug. 12, 2010, entitled "System and Method for Association and Uplink Adaptation in a Relay Network" claiming priority to U.S. Provisional Application No. 61/233,429 filed on Aug. 12, 2009, entitled "System and Method for Association and Uplink Adaptation in a Relay Network", which are incorporated by reference herein as if reproduced in their entirety.

BACKGROUND

The present invention relates generally to data transmission in communication systems and more specifically to systems and methods for association and uplink adaptation and power control in a relay network.

As used herein, the terms "user agent" and "UA" can refer to wireless devices such as mobile telephones, personal digital assistants, handheld or laptop computers, and similar devices or other User Equipment ("UE") that have telecommunications capabilities. In some embodiments, a UA may refer to a mobile, wireless device. The term "UA" may also refer to devices that have similar capabilities but that are not generally transportable, such as desktop computers, set-top boxes, or network nodes. Throughout the present disclosure the term "UA" is equivalent to the term "UE".

In traditional wireless telecommunications systems, transmission equipment in a base station or other network node transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems and equipment will eventually result in an LTE advanced (LTE-A) system. As used herein, the phrase "base station" will refer to any component, such as a traditional base station or an LTE or LTE-A base station (including eNBs), that can provide a UA with access to other components in a telecommunications system.

In mobile communication systems such as the E-UTRAN, a base station provides radio access to one or more UAs. The base station comprises a packet scheduler for dynamically scheduling downlink traffic data packet transmissions and granting resources for uplink traffic data packet transmission for all the UAs communicating with the base station. The functions of the scheduler include, among others, dividing the available air interface capacity between UAs, deciding the transport channel to be used for each UA's packet data transmissions, and monitoring packet allocation and over-the-air resource utilization. The scheduler dynamically allocates resources for Physical Downlink Shared CHannel (PDSCH) and grants resources for Physical Uplink Shared CHannel (PUSCH) data transmissions, and sends scheduling information to the UAs through a control channel.

To facilitate communications, a plurality of different communication channels are established between a base station and a UA including, among other channels, a Physical Downlink Control Channel (PDCCH). As the label implies, the PDCCH is a channel that allows the base station to control a UA during downlink data communications. To this end, the PDCCH is used to transmit scheduling or control data packets referred to as Downlink Control Information (DCI) packets to the UA to indicate scheduling to be used by the UA to receive downlink communication traffic packets or transmit uplink communication traffic packets or specific instructions to the UA (e.g. power control commands, an order to perform a random access procedure, or a semi-persistent scheduling activation or deactivation). A separate DCI packet may be transmitted by the base station to the UA for each traffic packet/sub-frame transmission.

In some network implementations, relay nodes (RNs) may be included amongst the various network components to efficiently extend a UA's battery life and increase UA throughput. For example, in some networks, base stations and RNs may work together to transmit the same signal to a UA at the same time. In such a system, the signals transmitted by the base station and RN may combine (i.e., superpose) in the air to provide a stronger signal and thus increase the chance of transmission success. In other networks, base stations and RNs transmit different signals to the UA, which, for example, include different data that is to be communicated to the UA. By transmitting different portions of the data through different base stations and/or RNs, the throughput to the UA may be increased. The use of a combination of base stations and RNs depends on many factors including channel conditions at the UA, available resources, Quality of Service (QoS) requirements, etc. As such, in some network implementations, in a given cell or combination of cells only a subset of available UAs may be serviced with combinations of base stations and RNs.

FIG. 1 is an illustration of a wireless communications network that incorporates base stations and RNs for transmitting data to a UA. Several RNs 100 are positioned around the edges of cells 102 and 104. The network includes several base stations 12 for coordinating network communications, which may include eNBs. The combination of RNs 100 and base stations 12 communicate with UAs 10. In FIG. 1, UA 10a is served by a lone RN 100a. Because RNs 100 are distributed about the edge of cells 102 and 104, UAs 10 can access the network at a higher data rate or lower power consumption by communicating directly with RNs 100 rather than base stations 12.

In a network that includes RNs in combination with base stations, there can be significant difference between the base station's transmission power (e.g., 46 dBm) and an RN's transmission power (e.g. 30 dBm). The difference in transmission power can lead to different coverage areas for both the RNs and base stations. In any network, however, the UA has only a single transmission power for signals transmitted to the RN and/or the base station and the received power for such a signal is dependent on the propagation path between the UA and the RN or the base station. As such, there may be times when the UA receives a stronger downlink (DL) transmission from the base station than from an RN while the RN receives a stronger uplink (UL) UA transmission than the base station. This situation results in an uplink/downlink (UL/DL) imbalance situation. In UL/DL imbalance, on the UL, the best serving node (e.g., base station or RN) may be the one that has the smallest coupling loss (e.g., path loss plus the transmit and receive antenna gains) with the UA while on the DL, the best serving node may be the one that provides the strongest DL received power at the UA (i.e., includes the transmit power of the node besides the coupling loss).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
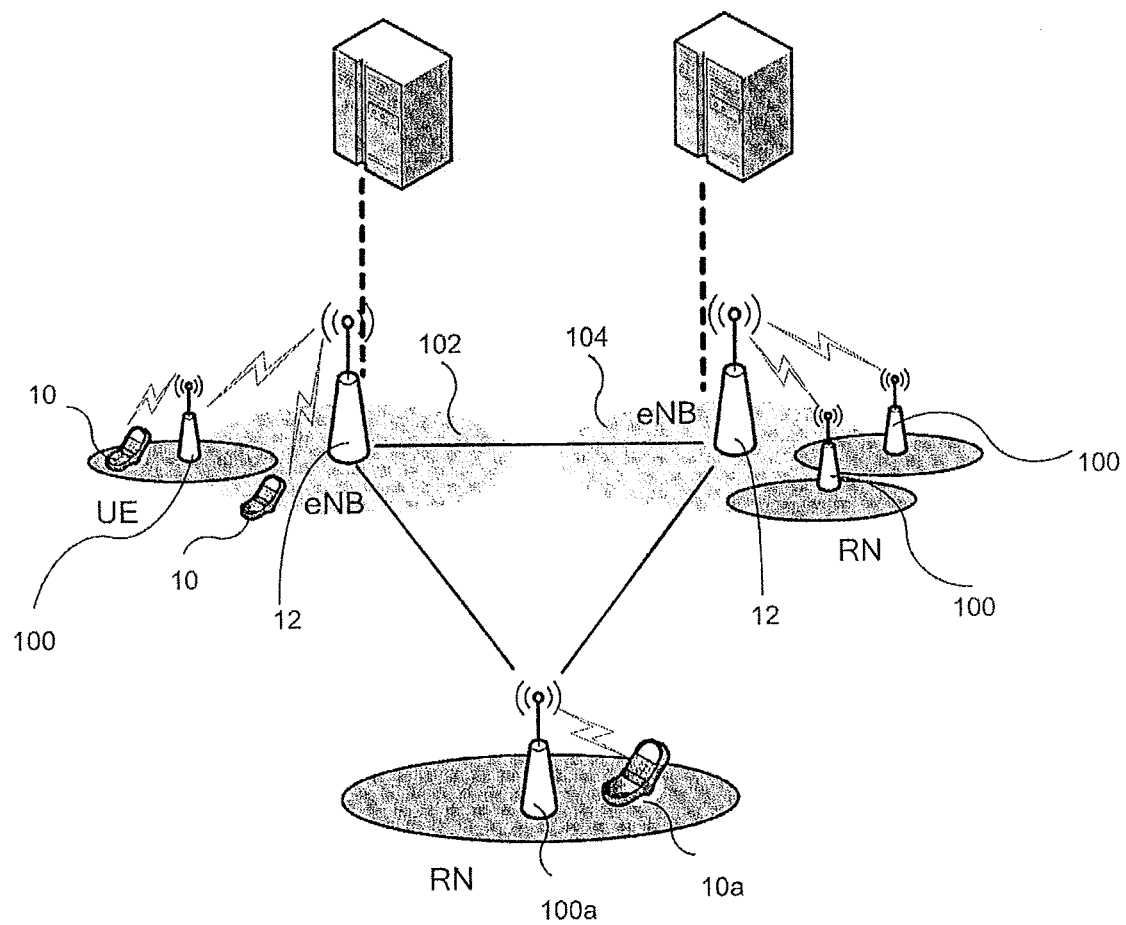
FIG. 1 is an illustration of a wireless communications network that incorporates base stations and relay nodes (RNs) for transmitting data to a user agent (UA)

The present invention relates generally to data transmission in communication systems and more specifically to methods and systems for association and uplink adaptation and power control in a relay network.

Some embodiments include a method for allocating resources of a wireless communication system. The wireless communication system includes a base station and a plurality of relay nodes (RNs). The method includes detecting power levels of downlink (DL) communication channels between the base station and a user agent (UA) and between each of the plurality of RNs and the UA, and detecting coupling losses of uplink (UL) communication channels between the base station and the UA and between each of the plurality of RNs and the UA. When the power level of the DL communication channel between the base station and the UA is greater than the power levels of the DL communication channels between each of the plurality of RNs and the UA, and the coupling losses of the UL communication channel between at least one of the RNs and the UA are less than the coupling losses of the UL communication channel between the base station and the UA, the method includes allocating a DL communication channel resource on the base station to the UA, and allocating a UL communication channel resource on the at least one of the plurality of RNs to the UA.

Other embodiments include a method for allocating resources of a wireless communication system. The wireless communication system including a base station and a plurality of relay nodes (RNs). The method includes receiving sounding reference signals (SRSs) from at least one of a UA and the plurality of RNs. The SRSs describe power levels of uplink (UL) communication channels between the UA and the base station and between the UA and each of the plurality of RNs. When a power level of a UL communication channel between the UA and at least one of the plurality of RNs is greater than the power level of the UL communication channel between the UA and the base station, identifying one of the RNs having the UL communication channel with the greatest power level out of the plurality of RNs, the method includes determining a receiving power of the UA from the base station and a receiving power of the UA from one of the plurality of RNs. When the receiving power of the UA from the base station is greater than the receiving power of the UA from one of the plurality of RNs, the method includes allocating UL communication channel resources on both the base station and the one of the plurality of RNs to the UA, and allocating a downlink (DL) communication channel resource on the base station to the UA.

Other embodiments include a base station for allocating resources of a wireless communication system. The wireless communication system includes the base station and a plurality of relay nodes (RNs). The base station includes a processor. The processor is configured to detect power levels of downlink (DL) communication channels between the base station and a user agent (UA) and between each of the plurality of RNs and the UA, and detect coupling losses of uplink (UL) communication channels between the base station and the UA and between each of the plurality of RNs and the UA. Instead of detecting coupling losses of uplink (UL) communication channels between the base station and the UA and between each of the plurality of RNs and the UA, another embodiment is to detect the coupling loss difference between the uplink communications channels between the base station and the UA and between each of the plurality of RNs and the UA. When the power level of the DL communication channel between the base station and the UA is greater than the power levels of the DL communication channels between each of the plurality of RNs and the UA, and the coupling losses of the UL communication channel between at least one of the RNs and the UA are less than the coupling losses of the UL communication channel between the base station and the UA, the processor is configured to allocate a DL communication channel resource on the base station to the UA, and allocate a UL communication channel resource on the at least one of the plurality of RNs to the UA.

Other embodiments include a base station for allocating resources of a wireless communication system. The wireless communication system includes the base station and a plurality of relay nodes (RNs). The base station includes a processor. The processor is configured to receive sounding reference signals (SRSs) from at least one of a UA and the plurality of RNs. The SRSs describe power levels of uplink (UL) communication channels between the UA and the base station and between the UA and each of the plurality of RNs. When a power level of a UL communication channel between the UA and at least one of the plurality of RNs is greater than the power level of the UL communication channel between the UA and the base station, identify one of the RNs having the UL communication channel with the greatest power level out of the plurality of RNs, the processor is configured to determine a receiving power of the UA from the base station and a receiving power of the UA from one of the plurality of RNs. When the receiving power of the UA from the base station is greater than the receiving power of the UA from one of the plurality of RNs, the processor is configured to allocate UL communication channel resources on both the base station and the one of the plurality of RNs to the UA, and allocate a downlink (DL) communication channel resource on the base station to the UA.

Other embodiments include a method for determining a Modulation and Coding Scheme (MCS) for a wireless communication system. The wireless communication system includes a base station and a relay node (RN). At least one of the base station and the RN is configured to communicate with a user agent (UA) using at least one of an uplink (UL) and downlink (DL) communication channel. The method includes defining an MCS using at least one of a signal quality value of the communication channel between the UA and the base station, a coupling loss between the UA and the base station, and a coupling loss between the UA and the RN, and detecting an error rate of a communication channel between the UA and at least one of the base station and the RN. When the error rate is below a threshold, the method includes at least one of increasing the MCS, and reducing a transmission power of the UA. When the error rate is above a threshold, the method includes at least one of decreasing the MCS, and increasing a transmission power of the UA.

Other embodiments include a method for determining a Modulation and Coding Scheme (MCS) for a wireless communication system. The wireless communication system includes a base station and a relay node (RN). At least one of the base station and the RN is configured to communicate with a user agent (UA) using at least one of an uplink (UL) and downlink (DL) communication channel. The method includes detecting an error rate of a communication channel between the UA and at least one of the base station and the RN. When the error rate is below a threshold, the method includes at least one of increasing the MCS, and reducing a transmission power of the UA. When the error rate is above a threshold, the method includes at least one of decreasing the MCS, and increasing a transmission power of the UA.

Other embodiments include a base station for determining a Modulation and Coding Scheme (MCS) for a wireless communication system. The wireless communication system includes the base station and a relay node (RN). At least one of the base station and the RN is configured to communicate with a user agent (UA) using at least one of an uplink (UL) and downlink (DL) communication channel. The base station includes a processor. The processor is configured to define an MCS using at least one of a signal quality value of the communication channel between the UA and the base station, a coupling loss between the UA and the base station, and a coupling loss between the UA and the RN, and detect an error rate of a communication channel between the UA and at least one of the base station and the RN. When the error rate is below a threshold, the processor is configured to at least one of increase the MCS, and reduce a transmission power of the UA. When the error rate is above a threshold, the processor is configured to at least one of decrease the MCS, and increase a transmission power of the UA.

Other embodiments include a base station for determining a Modulation and Coding Scheme (MCS) for a wireless communication system. The wireless communication system including the base station and a relay node (RN). At least one of the base station and the RN is configured to communicate with a user agent (UA) using at least one of an uplink (UL) and downlink (DL) communication channel. The base station includes a processor. The processor is configured to detect an error rate of a communication channel between the UA and at least one of the base station and the RN. When the error rate is below a threshold, the processor is configured to at least one of increase the MCS, and reduce a transmission power of the UA. When the error rate is above a threshold, the processor is configured to at least one of decrease the MCS, and increase a transmission power of the UA.

Other embodiments include a wireless communication system, comprising a user agent (UA) for communicating with a base station and a relay node (RN). The UA is configured to receive an instruction from the base station. The instruction may specify a Modulation and Coding Scheme (MCS) or instruct the UA to modify a power level of the UA. The system includes a base station configured to define an MCS and to detect an error rate of a communication channel between the UA and at least one of the base station and the RN. When the error rate is below a threshold, the base station is configured to transmit an instruction to the UA including at least one of an increased MCS and a reduced transmission power specification. When the error rate is above a threshold, the base station is configured to transmit an instruction to the UA including at least one of a decreased MCS and an increased transmission power specification.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 2:
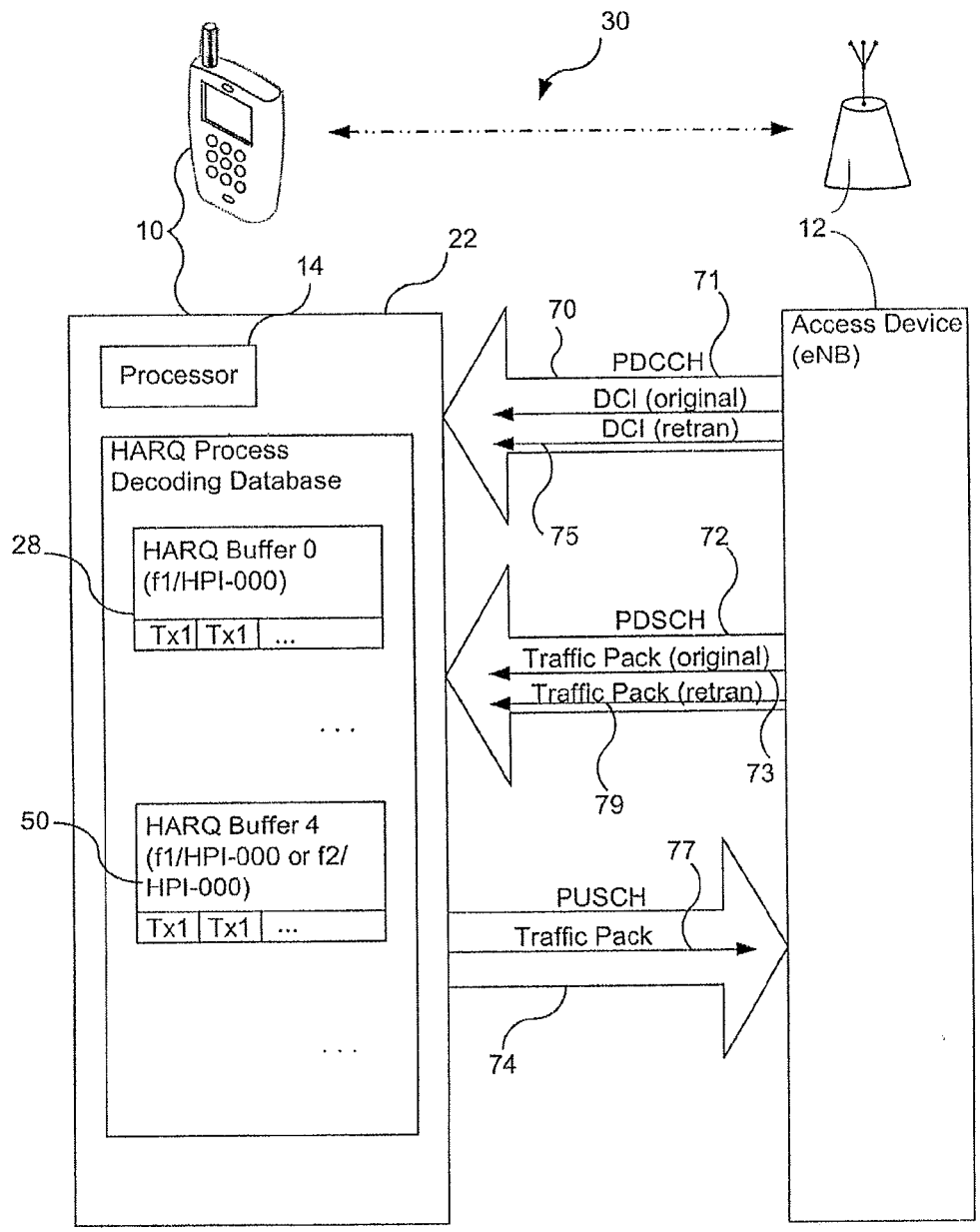
FIG. 2 is a schematic diagram illustrating an exemplary multi-channel communication system including a UA and an access device.

Referring now to the drawings wherein like reference numerals correspond to similar elements throughout the several views, FIG. 2 is a schematic diagram illustrating an exemplary multi-channel communication system 30 including a UA 10 and an access device 12. Although not shown, the communication system 30 may include one or more RNs in communication with UA 10. UA 10 includes, among other components, a processor 14 that runs one or more software programs wherein at least one of the programs communicates with access device 12 to receive data from, and to provide data to, access device 12. When data is transmitted from UA 10 to device 12, the data is referred to as uplink data and when data is transmitted from access device 12 to UA 10, the data is referred to as downlink data. Access device 12, in one implementation, may include a base station such as an E-UTRAN node B (eNB), a relay node (RN) or other network component for communicating with UA 10.

To facilitate communications, a plurality of different communication channels are established between access device 12 and UA 10. For the purposes of the present disclosure, referring to FIG. 2, the important channels between access device 12 and UA 10 may include a Physical Downlink Control CHannel (PDCCH) 70, a Physical Downlink Shared CHannel (PDSCH) 72 and a Physical Uplink Shared CHannel (PUSCH) 74. As the label implies, the PDCCH is a channel that allows access device 12 to control UA 10 during downlink data communications. To this end, the PDCCH can be used to transmit scheduling or control data packets referred to as downlink control information (DCI) packets to the UA 10 to indicate scheduling to be used by UA 10 to receive downlink communication traffic packets or transmit uplink communication traffic packets or specific instructions to the UA (e.g. power control commands, an order to perform a random access procedure, a semi-persistent scheduling activation or deactivation). A separate DCI packet may be transmitted by access device 12 to UA 10 for each traffic packet/sub-frame transmission. Exemplary DCI packets are indicated by communication 71 on PDCCH 70 in FIG. 1. Exemplary traffic data packets or sub-frames on pdsch 72 are labeled 73. The PUSCH 74 is used by UA 10 to transmit data sub-frames or packets to access device 12. Exemplary traffic packets on PUSCH 74 are labeled 77.

In a wireless communications network, RNs may be included amongst the various network components to efficiently extend a UA's battery life and increase UA throughput. In such a network, however, there can be a difference between the base station's transmission power (e.g., 46 dBm) and an RN's transmission power (e.g. 30 dBm) that leads to different coverage areas and sizes for both the RNs and base stations. In any network, however, the UA has only a single uplink (UL) transmission power for signals that may be received by the RN and/or the base stations and the received power for such a signal is dependent on the propagation path loss between the UA and the RN or base station. As such, there may be times when the UA receives a stronger DL transmission from the base station than from an RN while the RN receives a stronger UL UA transmission than the base station. This situation results in an uplink/downlink (UL/DL) imbalance. In UL/DL imbalance, on the UL, the best serving node (e.g., base station or RN) may be the one that has the smallest coupling loss (e.g., path loss plus antenna gains) with the UA, while on the DL, the best serving node may be the one that provides the strongest DL received power at the UA (i.e., includes the transmit power of the node besides the coupling loss).

Figure 3:
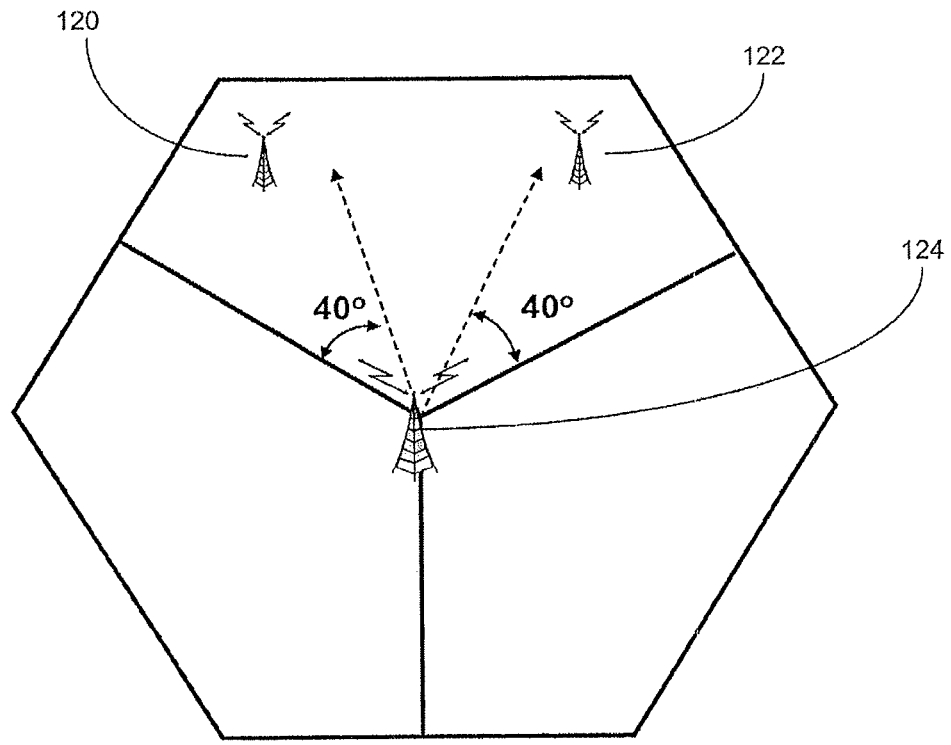
FIG. 3 illustrates a network simulation that includes two RNs placed at ¾ radius away from a base station at 70 and 110 degrees.

It is possible to simulate the impact of UL/DL imbalance. FIG. 3 illustrates a network simulation that includes two RNs 120 and 122 placed at ¾ radius away from a base station 124 at 70 and 110 degrees. In the simulation 700 UAs were placed uniformly in the cell sector containing RNs. Only path loss and shadowing are considered (fast fading is not considered). For the simulation, Table 1 shows the detailed simulation parameters. Using the simulation, it is possible to demonstrate the UL/DL imbalance that may result from a network configured as illustrated in FIG. 3.

TABLE 1

| Parameter | Assumption/Values |
|---|---|
| Cellular layout | 19 cells 57 sectors |
| Relay layout | 2 RNs per macro eNB cell |
| Inter-site distance (ISD) | 1732 m |
| Path loss for eNB <-> UA | L = 128.1 + 37.6log10(R), R in kilometers |
| Path loss for RN <-> UA | L = Prob(R) PLLOS(R) + [1 − Prob(R)]PLNLOS(R), R in km<br>PLLOS(R) = 103.8 + 20.9log10(R)<br>PLNLOS(R) = 145.4 + 37.5log10(R)<br>Prob(R) = 0.5 − min(0.5, 3exp(−0.3/R)) + min(0.5, 3exp(−R/0.095)) |
| Shadowing standard deviation | 10 dB (RN to UA); 8 dB (eNB to UA) |
| Shadowing correlation | 0.5 between sites (including eNB and RN); 1 between cells per site |
| Antenna pattern (horizontal) | eNB: beamwidth 70 degrees, Am = 20 dB. $$A(\theta) = -\min\left[12\left(\frac{\theta}{\theta_{3dB}}\right)^2, A_m\right]$$ RN: omni-directional |
| Minimum distance between UA and eNB | 35 m between UA and eNB |
| Tx power | 46 dBm for eNB, 30 dBm for RN |
| BS antenna gain | 14 dBi |
| Relay antenna gain | 5 dBi. |

Figure 4:
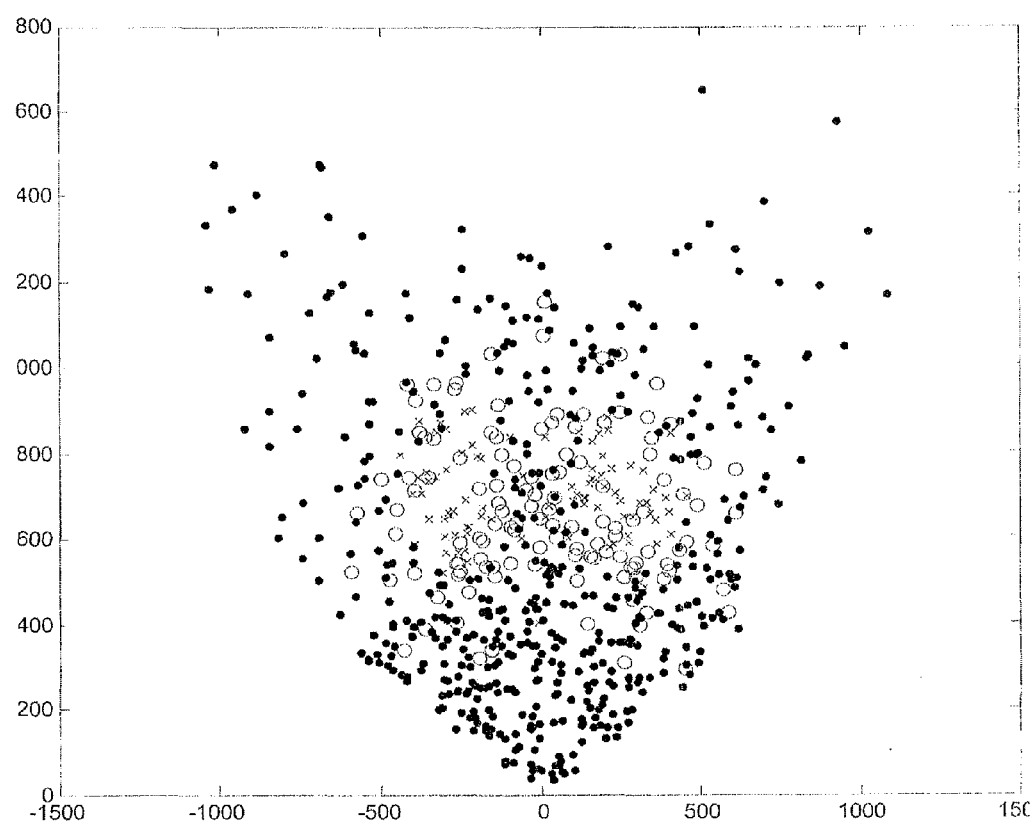
FIG. 4 is an illustration of simulation results for the network configuration illustrated in FIG. 3.

FIG. 4 illustrates simulation results for the network configuration illustrated in FIG. 3 with the x-axis representing the UA's horizontal distance in meters from base station 124 and the y-axis representing the UA's vertical distance in meters from base station 124. Each point illustrates a UA in either a first, second or third category. As shown in FIG. 4, nearly 69.6% of the UAs are in a first category illustrated by dots on FIG. 4. The first category represent UAs where the strongest DL receive power and the smallest UL coupling loss are both with base station 124 (i.e., it is preferable that both UL and DL communications channels be served by base station 124). As shown in FIG. 4, 12.7% of the UAs are in the second category (shown by Xs in FIG. 4) indicating the UA's best UL coupling loss and DL receive power would be with either RN 120 or 122 (i.e., it is preferable that both UL and DL communication channels be served by either RN 120 or 122, but not by base station 124). Finally, 17.7% of the UAs are in the third category (shown by Os in FIG. 4) indicating that the UAs are in the UL/DL imbalance region. As such, the UAs in the third category have the strongest DL receive power from base station 124 while the smallest UL coupling loss is with either RN 120 or 122.

Using the cumulative distributions of the UL coupling loss and DL receiving power for each of the UAs as illustrated in the results of FIG. 4, it is possible to define four independent schemes that may be used to associate each UA with base station 124, RNs 120 or 122, or a combination thereof.

The first assignment scheme is base station only. For example, all of the 700 UAs defined in the simulation may be configured to operate as if no RN is available.

The second assignment scheme is a first relay transmission scheme, in which all of the 700 UAs receive from and send to a single node (e.g., base station or RN) to which the UAs have the lowest coupling loss.

The third assignment scheme is a second relay transmission scheme, in which all of the 700 UAs receive from and send to the node (e.g., base station or RN) from which the strongest DL receiving power is received.

The fourth assignment scheme is an imbalanced scheme, in which all of the 700 UAs receive from the node (e.g., base station or RN) that provides the greatest DL power and the UA transmits to the node (e.g., base station or RN) to which the UA has the lowest coupling loss.

Figure 5:
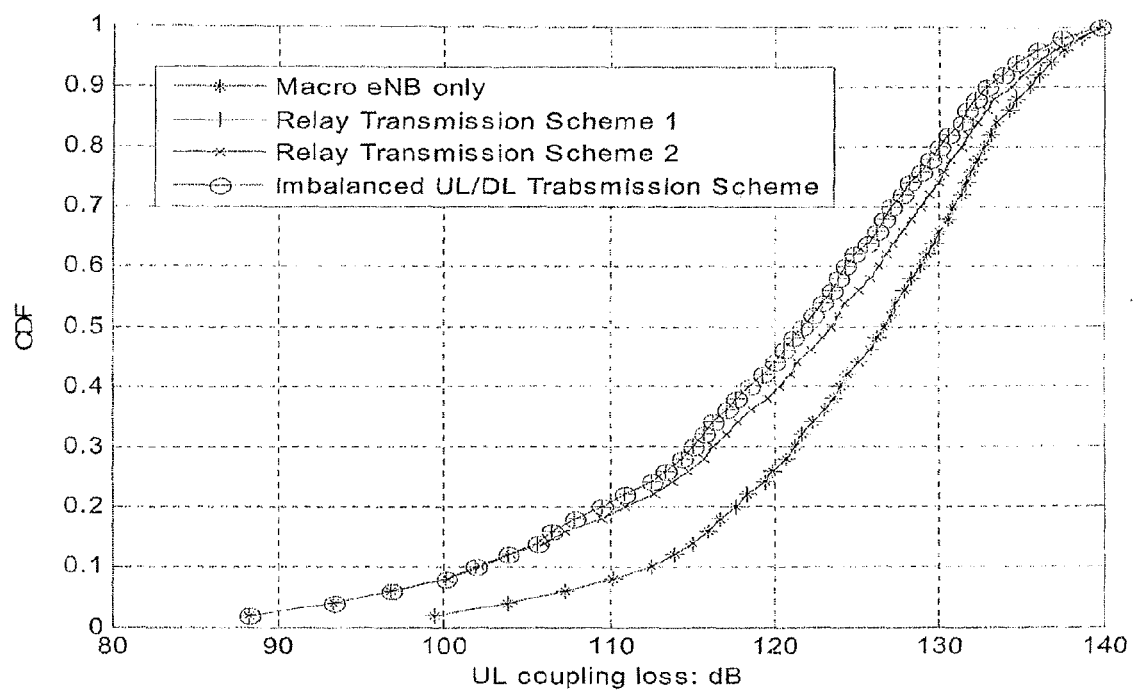
FIG. 5 is an illustration of the uplink (UL) coupling loss comparisons among the four assignment schemes when applied to the simulation data of FIG. 4.

FIG. 5 is an illustration of the UL coupling loss comparisons among the four assignment schemes when applied to the simulation data of FIG. 4. FIG. 5 shows Cumulative Distribution Function (CDF) of the UL coupling loss in dB (shown on the x-axis) for each of the four assignment schemes. Both the first relay transmission scheme and the imbalanced scheme achieve the smallest coupling loss. Compared to the base station-only scheme, the second relay transmission scheme may reduce, on average, 4.1 dB UA coupling loss while the first relay transmission scheme and the imbalanced scheme may both reduce, on average, 5.4 dB UA coupling loss. In some cases, smaller UA coupling losses may lead to UAs transmitting with lower power that may cause less UL interference and save UA battery power.

Figure 6:
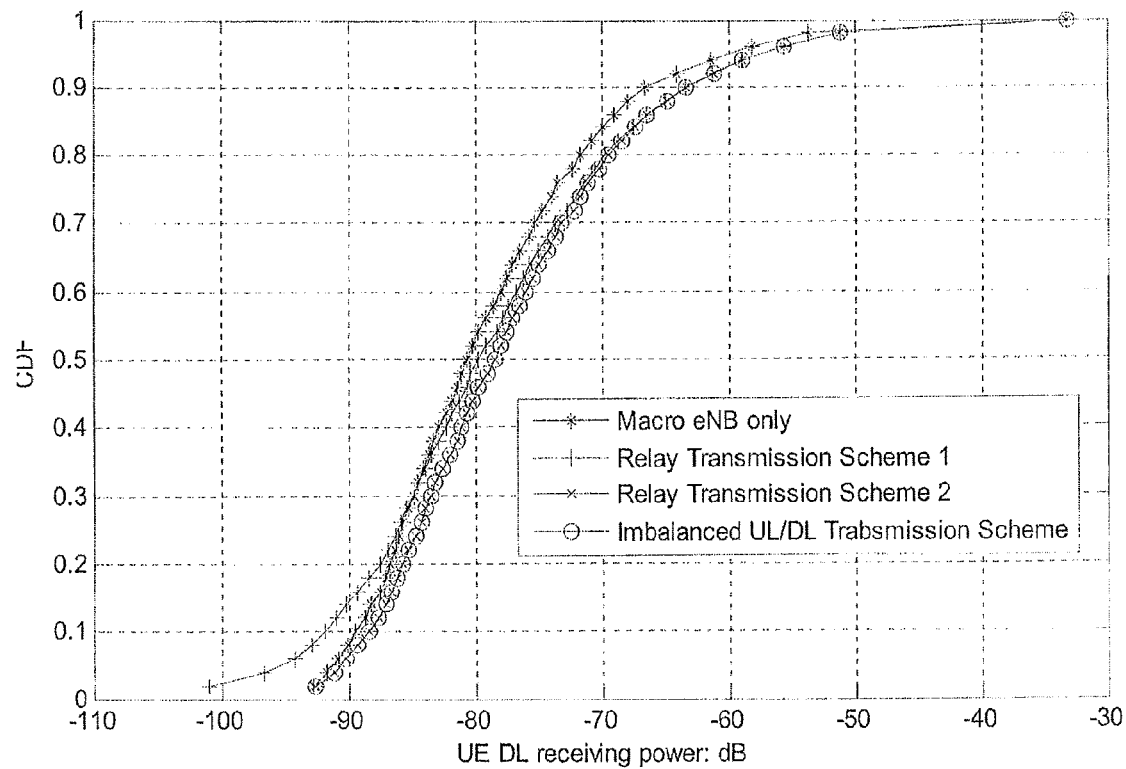
FIG. 6 is an illustration of comparisons of the UA downlink (DL) receive power among the four schemes when applied to the simulation data of FIG. 4.

FIG. 6 is an illustration of comparisons of the UA DL receive power among the four schemes when applied to the simulation data of FIG. 4. FIG. 6 shows the Cumulative Distribution Function of the UA DL receiving power (shown on the x-axis) for each of the four assignment schemes. The first relay transmission scheme may achieve, on average, 0.3 dB less DL receive power than with the base station-only scheme because some of the UAs operate in the imbalanced region. The imbalanced UAs select the RN over the base station as the DL receiving node resulting in a smaller receive power on the DL. On the other hand, the second relay transmission scheme and the imbalance transmission scheme show a 1.79 dB higher average DL receiving power than with the base station-only transmission scheme. The second relay transmission scheme and the imbalanced transmission scheme, therefore, may maximize the average DL receiving power by allowing the UAs in the imbalanced region to receive DL transmission directly from the base station. Stronger DL receiving power means better overall throughput and better QoS.

Generally, the first relay transmission scheme minimizes UL coupling loss but results in a reduced DL receive power while the second relay transmission scheme maximizes the UA DL receive power but results in higher UL coupling loss. The imbalanced scheme, on the other hand, may simultaneously minimize UL coupling loss and maximize the UA DL receive power.

In a network that incorporates one or more RNs, the RNs may be configured to assist a base station with DL and/or UL transmissions to or from a UA. Because a UA may be associated with one or more base station and/or RN, UA association types can be defined to classify the connection between the UA and the base station and/or RN.

In a first association type, a UA is associated with only the base station. In the first association type, no available RNs may participate with any transmissions to or from that UA. As a result, the RN does not need to decode PDCCH channels with DCI format 0 (UL scheduling grant) and with DCI formats 1 and 2 (DL scheduling grants) for that UA.

In a second association type, a UA is associated with the base station and an RN for both UL and DL communications. In this case, the RN may participate with both UL and DL transmissions to or from that UA. As such, the RN may need to decode all PDCCH channels with DCI formats 0, 1, and 2 for UL and DL communications with that UA.

In a third association type, a UA is associated with an RN only on UL transmissions, but with a base station for both UL and DL transmissions. In that case, the RN may only participate with a UA's UL transmissions. As such, the RN may only need to decode the PDCCH channel with DCI format 0 for UL communications with the UA.

In a fourth association type, a UA is associated with an RN only for DL transmissions, but with a base station for both UL and DL transmissions. In this case, the RN may only participate with the UA's DL transmissions. As such, the RN may only need to decode the PDCCH channels with DCI formats 1 and 2 for that UA.

In the present system, therefore, a base station may be configured to determine whether a UA is operating 1) with the strongest DL receive power and the smallest UL coupling loss being both with the base station, 2) with the UA's best UL coupling loss and DL receive power being with an RN, or 3) where the UAs are in the UL/DL imbalanced region. Based upon the determination, the base station may allocate one of the association types to the UA causing the UA to be assigned UL and DL communication channel resources on a base station and an RN, or a combination of RNs. The various association types that may be allocated to a UA are summarized in Table 2.

TABLE 2

| Association Type | UL with | DL with |
| --- | --- | --- |
| 1 | Base Station | Base Station |
| 2 | Base Station + RN | Base Station + RN |
| 3 | Base Station + RN | Base Station |
| 4 | Base Station | Base Station + RN |

If the base station determines that the UA should be associated with an RN, the base station may use any available measurement data to determine the RN to which the UA should be associated. For example, in LTE or LTE-Advanced, the UA may transmit UL Sounding Reference Signals (SRSs) or other UL control channels (e.g., PUCCH) for channel quality measurements and uplink timing estimation. For example, for all UAs associated with a particular base station, the base station may forward the UA's SRS or control channel configurations (potentially including monitoring parameters) to all the RNs accessible to the base station for association purposes. As such, the RNs may monitor the SRS transmissions from all UAs, forward the measurements to the base station and then the base station may determine the RN to which the UA may be near and with which the UA should be associated. The base station can also use the same method, i.e. RNs monitoring SRS transmissions from the UAs and forwarding the measurements to the base station, to decide whether a UA should be associated with only the base station or with one of the RNs.

In one implementation of the present system, UA transmission power per resource element (RE) (PUA) minus the UA's coupling loss with the base station (CeNB) is equal to the power density of the SRS received by the base station (ULeNB_P). Also, PUA minus the UA's coupling loss with RNi (Crelay_i) is equal to the power density of the SRS received by RNi (ULrelay_P_i), ULrelay_P_i−ULeNB_P=CeNB−Crelay_i. Given the foregoing, the following examples describe various algorithms for analyzing the coupling loss and DL received power of a UA for allocating one of the four association types as described above. In the following examples, the notations as illustrated in Table 3 are used.

TABLE 3

| Symbols | Stand for |
| --- | --- |
| UL_eNB_P | The power density of the SRS received by the base station |
| UL_relay_P_i | The power density of the SRS received by RN i |
| UL_eNB_Q | The channel quality estimated from the SRS received by the base station |
| UL_relay_Q_i | The channel quality estimated from the SRS received by RN i |
| P_eNB | base station transmission power |
| P_relay_i | RN i transmission power. |
| C_eNB | UA's coupling loss with the base station |
| C_relay_i | UA's coupling loss with the RN i |
| P_UA | UA transmission power per RE |
| P_eNB − C_eNB | UA DL receiving power from base station |
| P_relay_i − C_relay_i | UA DL receiving power from RN i |

In the present example, if the difference between the power of the SRS received by the base station and each RN is greater than or equal to a pre-defined margin (ULeNB_P−ULrelay_P_i>margin0), for all i, the UA UL communication channel may be associated with the base station only. In this example, margin0 defines a micro-diversity range to ensure that the UA's UL association with the base station only may lead to a sufficiently small coupling loss on the UL channel.

Then, if the base station transmission power received by the UA is greater than RN transmission power received by the UA by a predefined margin (PeNB−CeNB>Prelay_i−Crelay_i+margin1 or, equivalently, PeNB−Prelay_i>ULrelay_P_i−ULeNB_P+margin1), for all i, the UA DL is also associated with the base station only. This corresponds to the first association type described above.

If, however, the base station transmission power received by the UA is not greater than RN transmission power received by the UA by a predefined margin (in other words, there exists at least one integer i, such that PeNB−CeNB<=Prelay_i−Crelay_i+margin1 or, equivalently, PeNB−Prelay_i<=ULrelay_P_i−ULeNB_P+margin1), the system first defines the set of RNs as Ω such that every RN belonging to Ω meets this criteria. Then the system selects the RN within Ω with the greatest transmission power received by the UA. (In other words, the system selects RNj in the set Ω such that Prelay_j−Crelay_j is the largest) The UA may then be associated with both the base station and RNj for DL communications. This corresponds to the fourth association type described above.

Alternatively, if there exists at least one integer i such that the difference between the power of the SRS received by the base station and each RNi is less than a pre-defined margin (e.g., ULeNB_P−ULrelay_P_i<margin0), define the set of RNs as Ω such that every RN belonging to Ω meets this criteria. Then the system selects the RN within Ω with the highest power SRS received by the RN, (in other words, the system selects RNj in set Ω such that ULrelay_P_j is the largest).

Then, if the base station's transmission power minus the base station's coupling loss is greater than RNj's transmission power minus the RNj's coupling loss plus a margin (e.g., PeNB−CeNB>Prelay_j−Crelay_j+margin1 or equivalently PeNB−Prelay_j>ULrelay_P_j−ULeNB_P+margin1), the UA may be associated with the base station for DL communications and associated with both the base station and RNj for UL communications. This corresponds to the third association type as described above. In this case, margin1 defines a macro-diversity range to ensure that the UA's DL association with only the base station may lead to a sufficiently strong DL receiving power from the base station.

If, however, the base station's transmission power minus the base station's coupling loss is not greater than RNj's transmission power minus the RN's coupling loss plus a margin (e.g., PeNB−CeNB<=Prelay_j−Crelay_j+margin1 or equivalently Pe_NB−Prelay_j<=ULrelay_P_j−ULeNB_P+margin1), the UA may be associated with the base station and RNj for both UL and DL communications. This corresponds with the second association type as described above.

Figure 7:
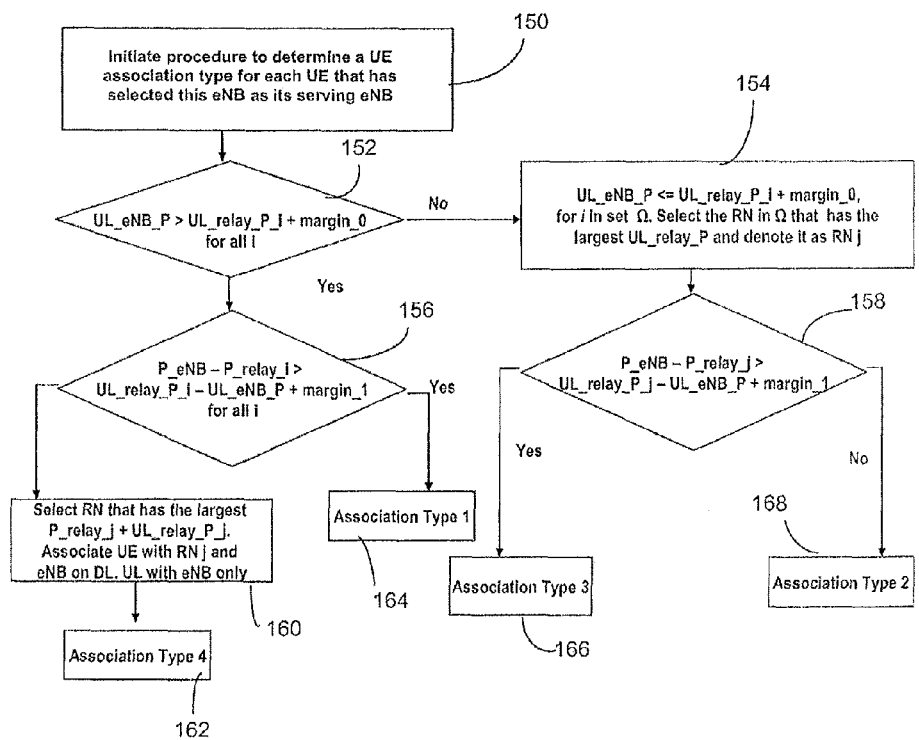
FIG. 7 is a flow chart illustrating an example method for implementing the UA association algorithm of the present system.

FIG. 7 is a flow chart illustrating an example method for implementing the UA association algorithm of the present system. In step 150, for each base station and every UA that has selected the base station as the UA's serving base station, the system starts a procedure to decide the UA's association type. To determine the association type, in step 152, the system evaluates whether the power of SRS received by the base station is greater than the power of SRS received by any of the RNs for a particular UA. For example, in FIG. 7, the system evaluates whether ULeNB_P>ULrelay_P_i+margin0 for all i. If not, and the power of the SRS received by one of the available relay nodes is greater than the power received by the base station minus margin0, in step 154 the system determines which relay node receives the signal having the greatest power. For example, for i in the set of RNs Ω, the system selects the RN in Ω that has the largest ULrelay_P and denotes it as RNj. In step 158, the system then allocates association types based upon the downlink receiving power, which is determined by the difference of the transmission powers of the base station and selected RN, and the difference in the SRS powers received by the base station and selected RN. For example, if PeNB−Prelay_j>ULrelay_P_j−ULeNB_P+margin1, the system associates the UA with association type 3 in step 166. If not, the system associates the UA with association type 2 in step 168.

In step 156, if the power of SRS received by the base station is greater than the power of SRS received by any of the relay nodes, the system evaluates the downlink receiving power of the base station and the relay node by determining whether the difference of the transmission powers of the base station and RN is greater than the difference in the SRS powers received by the base station and RN for all the available RNs. For example, the system evaluates PeNB−Prelay_i>ULrelay_P_i−ULeNB_P+margin1 for all RNs i If the difference of the transmission powers of the base station and RN is greater than the difference in the SRS powers received by the base station and RN for all available RNs, the system allocates the UA the first association type in step 164. If not, the system selects the RN that has the largest transmission power (Prelay_j)+received SRS power (ULrelay_P_j) and associates the UA with the selected RN and the base station for DL communications and with the base station only for UL communications. In step 162, the system allocates the UA the fourth association type.

In the UA association algorithm illustrated in FIG. 7, the UAs in the first category of FIG. 4 (i.e., those UA's having the strongest DL receive power and the smallest UL coupling loss both with the base station) may most likely be allocated the first association type, while the UAs in the second category (i.e., the UA's best UL coupling loss and DL receive power are with an RN) may most likely be allocated the second association type. The UAs in the imbalance region (the third category) may most likely be allocated the third association type. The fourth association type may be allocated when the RN transmission power is larger than that of the base station with a certain margin (e.g., Prelay>Pbase_station+margin0−margin1). In the imbalanced region, the base station may have better DL coverage while RNs have better UL coverage. As such, UAs in the imbalanced region may not need RNs to participate in DL transmission but may need RNs to participate in UL transmission. The addition of the third association type may help reduce DL interference to other sectors and also reduce RN PDCCH blind decoding complexity as well as backhaul traffic load (e.g., the base station does not need to transmit these UAs' DL control and data to an RN). The bigger the imbalanced region, the more performance gain the present association algorithm may achieve. Note also that the present association algorithm may reduce both the DL interference and backhaul traffic load in a particular implementation. For example, for the third association type, the RN may only assist the UL transmission from the UA. This may reduce the DL interference caused by the RN as well as reducing the traffic over the wireless backhaul link (e.g., the base station does not need to transmit the UA's DL control and data to the RN).

In a network that incorporates one or more RNs, as discussed above, the RNs may be configured to participate in a UA's UL and DL transmissions. In the case of UL transmissions, a UA may send the first transmission directly to both the base station and an RN. If the first transmission to the base station fails, starting for the first retransmission, the base station may be configured to receive UL data from both the UA and the RN. Because synchronous non-adaptive Hybrid Automatic Repeat reQuest (HARQ) may be used in UL transmissions, the same Modulation and Coding Scheme (MCS) may be used in the first transmission as well as all retransmissions. Due to the nature of the above-described RN-assisted UL transmissions, however, it is difficult to determine, based upon the channel conditions between the UA and eNB, which MCS to select for UL transmissions. In accordance with the present system, there are several possible ways to select the MCS.

First, the MCS may be selected based upon the UA to base station channel conditions. In that case, however, the MCS may be too conservative if the potential assistance that could be provided by an RN is not considered. Second, the MCS may be selected based upon the UA to RN channel conditions. This example, however, may not be reliable because the algorithm relies upon the UA to RN channel that is not a direct link to the base station. Third, the MCS may be selected based upon the RN to base station channel. Again, this may not be a reliable algorithm for selecting the MCS because the RN to base station link is only active when the UA to RN communication link is functional.

Generally, the channel quality on all three links (UA to base station, UA to RN, and RN to base station) may affect the MCS selection. Therefore, to maximize the benefits of the RN, the link adaptation may be based on a virtually combined channel that incorporates features and/or characteristics of all three links. Because it may be difficult for the base station to estimate the instantaneous combined channel conditions, an outer loop link adaptation and Close Loop Power Control (CLPC) may be used to adjust the MCS level and UA transmission power level based on a long term criteria such as a desired UA Frame Erasure Rate (FER) and/or HARQ target termination, on top of an Open Loop Power Control (OLPC) and inner loop link adaptation, which is based on instantaneous channel quality information and estimations.

For the OLPC, the power level may be set using a first option based upon UA to base station path loss, which may be estimated in accordance with conventional procedures. In some cases, however, because the RN may not transmit Cell-specific Reference Signals (CRSs), the path loss of the UA to RN channel may not be estimated using conventional methods. In that case, the power level may be set using a second option based on the UA to base station path loss plus an offset. The offset may be equal to Crelay−CeNB, which is the coupling loss difference between the UA to base station link and the UA to RN, or can be a function of Crelay−CeNB). The offset can be estimated using relative UL sounding signal strength differences between the UA to RN link and the UA to base station link. The base station may then signal the coupling loss difference to the UA and the UA can adjust the power offset accordingly. In some implementations, the base station may signal the appropriate $P_{O\_UA\_PUSCH}$ value that already includes the coupling loss difference to the UA.

In the above examples, the second option may lead to a lower power setting for the UA than the first option. Control signals such as ACK/NACK are often more delay stringent and are preferred to be directly received by the base station. As such, it may be preferable that power settings for the control signal be based on UA to base station path loss. Different power settings for UL control signals and data signals are feasible in Rel-8 when they are not transmitted simultaneously. In some cases, for example, for Rel-8 UAs, the OLPC may always be based on the first option and for Rel-10 UAs the OLPC may be based on the second option as described above.

Figure 8:
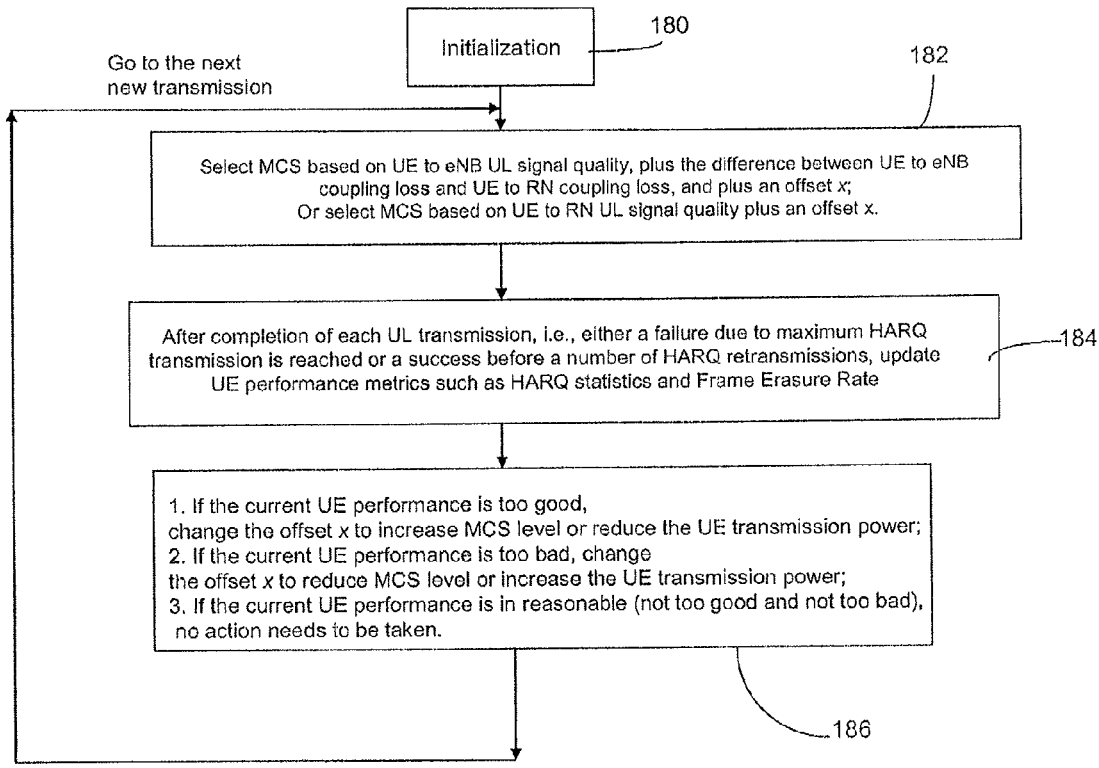
FIG. 8 illustrates a flow chart showing a general method for Modulation and Coding Scheme (MCS) selection and for modifying a transmission power level of a UA.

FIG. 8 illustrates a flow chart showing a general method for MCS selection and for modifying a transmission power level of a UA in accordance with the present disclosure. The first step 180 is for system initialization. In step 182, an MCS is selected based upon the UL signal quality between the base station (e.g., an eNB) and the UA and the coupling loss between the UA and base station and the UA and RN. For example, the system may select the MCS based upon the UA to base station signal quality, plus the difference between the UA to base station coupling loss and the UA to RN coupling loss, plus an offset. Alternatively, the MCS may be selected based upon the UA to RN UL signal quality plus an offset.

In step 184, after selecting an MCS, various system performance metrics are captured and analyzed to assist in determining whether the selected MCS is appropriate. For example, after completion of each UL transmission, the system may detect a failure due to a maximum number of HARQ retransmissions being reached or a success before the maximum number of HARQ retransmissions is not reached. In step 184, UA performance metrics such as HARQ statistics and Frame Erasure Rate (FER) are updated.

In step 186, the performance metrics are analyzed to determine whether the currently selected MCS and power levels are appropriate and whether any changes are necessary. For example, in step 186, the system may determine whether the current UA performance is too good (e.g., UA FER is too low and HARQ termination is too early). If so, the offset value may be changed to increase the MCS level, or the UA transmission power may be reduced. Alternatively, if the current performance of the UA is too bad (e.g., UA FER is too high or HARQ termination number is too high), the offset may be changed to reduce the MCS level or increase the UA transmission power. Finally, if the current UA performance is acceptable, the system may take no action and continue operation as normal. After modifying the MCS and UA power levels as necessary in step 186, the process repeats for future communications with the UA.

Figure 9:
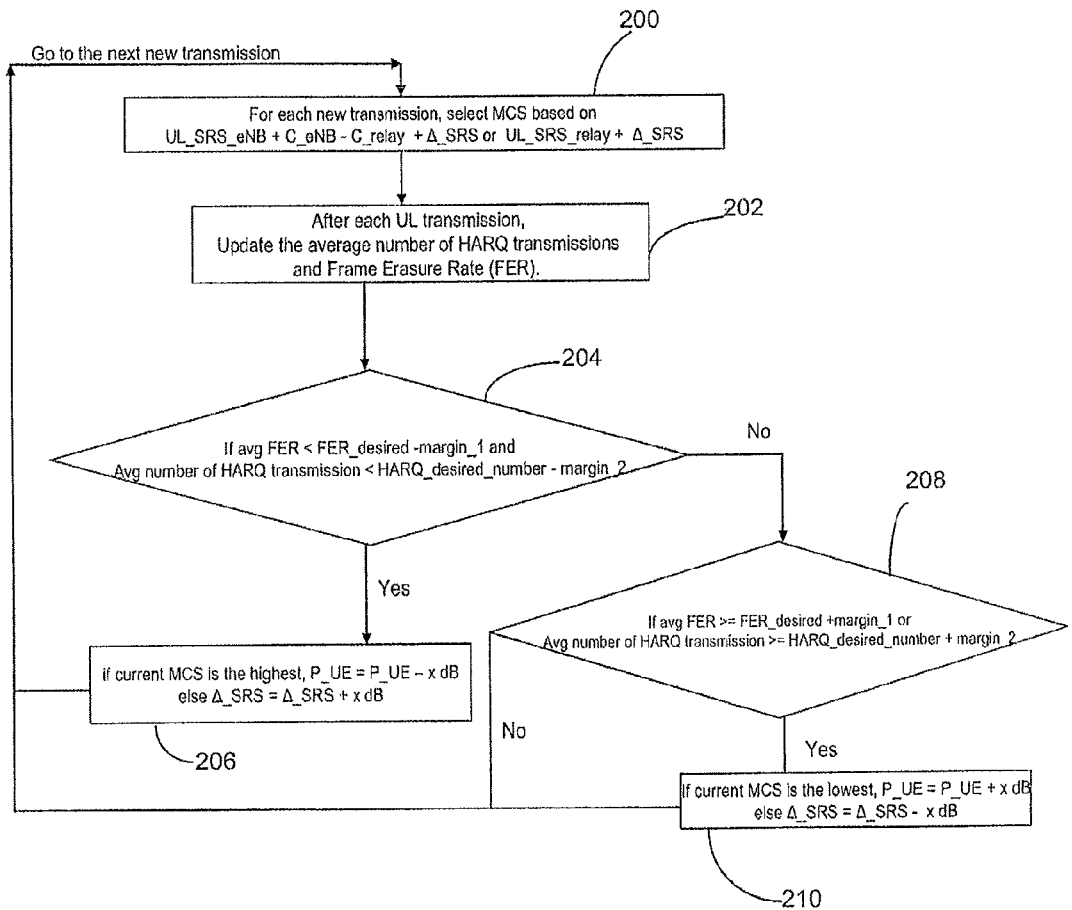
FIGS. 9-12 are illustrations of alternative flowcharts for implementing the UA link and power level adaptation algorithms of the present disclosure.
Figure 10:
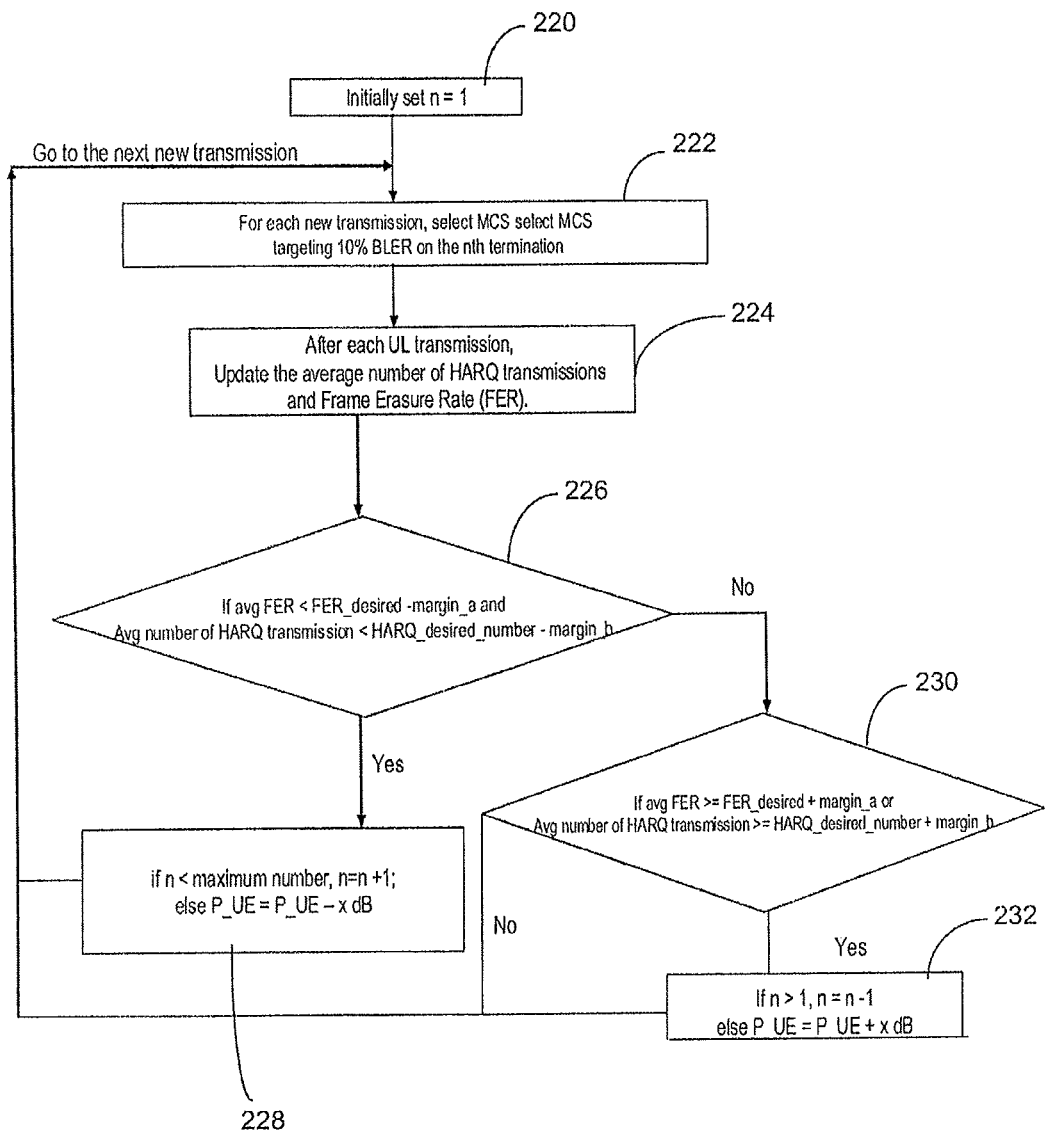
Figure 11:
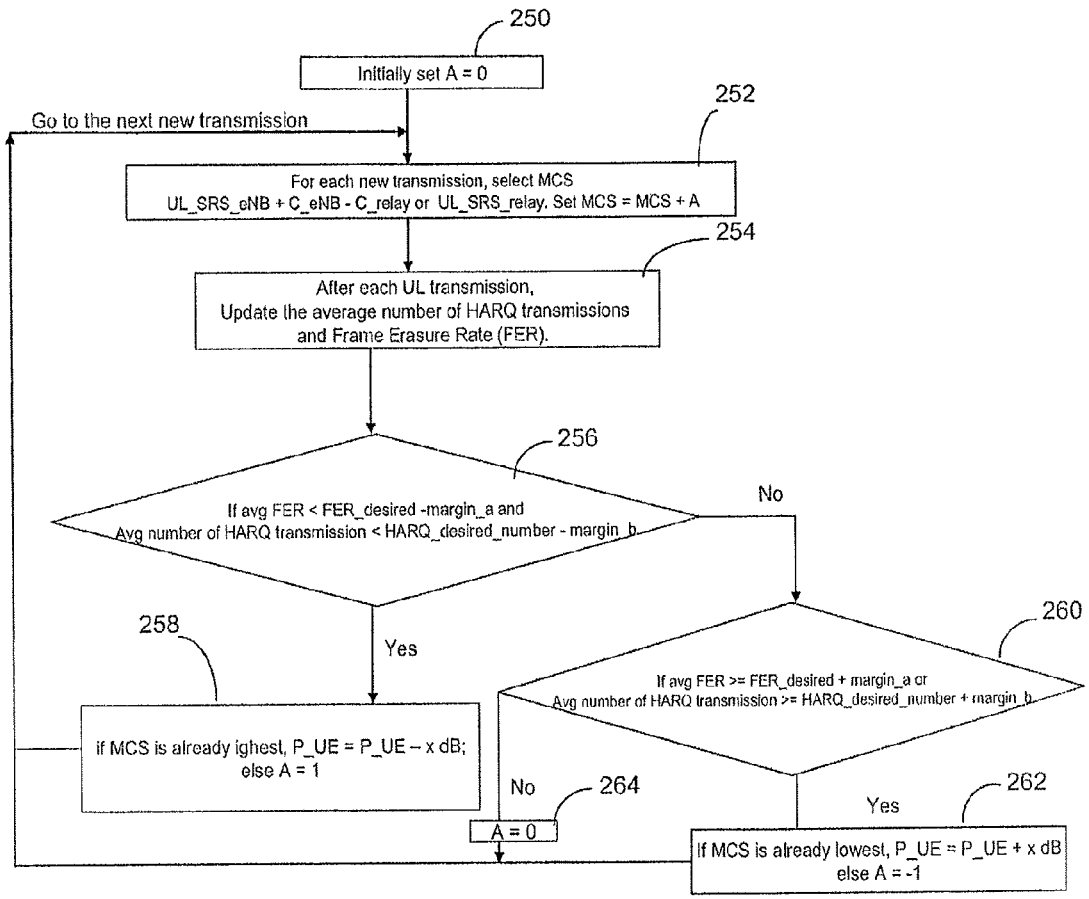

FIGS. 9-11 illustrate specific algorithms for implementing the general algorithm illustrated in FIG. 8. In a first specific implementation of the present system, as illustrated in FIG. 9, at the start of each new transmission, an MCS that targets a 10% BLock Error Rate (BLER) selected on the first termination in step 200. In these examples, when doing MCS selection and resource allocation, the base station may consider UA power headroom so that the maximum power of the UA may not be exceeded and also to allow the base station to select an MCS that results in a particular transmission power level at the UA. Power headroom may be computed by the UA based on the UA's current transmit power on the PUSCH and its maximum transmission power and the UA will send the power headroom report to the base station.

In step 200, the MCS may be selected using several options. First, if UA OLPC is based on UA to base station path loss, the base station may determine the MCS based on the channel quality estimation of the UA to base station link plus an offset. The channel quality estimation of the UA to base station link can be done, for example, using any existing Rel-8 mechanisms. In one example, the offset may be $\Delta SRS+$ the coupling loss difference between UA to base station (i.e., $\Delta SRS+CeNB-Crelay$). In this example, $\Delta SRS$ may be used to compensate the combined channel gain. The offset may initially be set to 0 and dynamically adjusted based on the UA QoS and performance requirements, e.g., HARQ termination statistics and FER.

Alternatively, if UA OLPC is based on UA to RN path loss, the base station may determine the MCS based on channel quality estimation of the UA to RN link plus an offset $\Delta SRS$. $\Delta SRS$ may be defined and adapted the same way as described above. In this case, however, the RN may need to periodically send UA to RN channel related information (for example, ULSRS and PUSCH Signal to Noise and Interference Ratio (SNIR)) to the base station through the wireless backhaul link so that the base station has knowledge of the UA to RN channel condition. To save bandwidth on backhaul, the channel information report can be sent in a delta format and is only needed when such delta reaches a certain threshold.

In step 202, after each UL transmission terminates (success or failure), the base station updates UA QoS related measurements, for example, the average number of HARQ transmissions and average Frame Erasure Rate (FER). In some implementations, the average is a window-based moving average. For a delay-critical application like Voice over Internet Protocol (VoIP), the system may use the ath percentile of HARQ transmission numbers, for example a=95, instead of average HARQ transmission numbers to do adaptation. Performing adaptation using this method, for example, may better control the 95th percentile delay, which may be defined by various network standards. Note that, FER is a measurement of the percentage of Transport Blocks (TB) that contain errors and could not be processed at the base station side after the maximum number of HARQ transmissions is reached.

In step 204, the system evaluates whether avg FER<FERdesired−margina or average number (or ath percentile) of HARQ transmission<HARQnumber_desired−marginb. In step 208, the system evaluates whether avg FER>=FERdesired+margina or average number (or ath percentile) of HARQ transmission>=HARQnumber_desired+marginb. If avg FER>=FERdesired+margina or average number (or ath percentile) of HARQ transmission>=HARQnumber_desired+marginb, the system evaluates whether the current MCS level is already the lowest in step 210. If so, the system sets PUA=PUA+xdB. This can be done by using CLPC TPC command (absolute or incremental). In this example, x is selected to terminate the next HARQ transmission one step earlier. Otherwise, the system sets $\Delta SRS=\Delta SRS-x$ dB. In this example, x can be selected so that MCS=MCS−1. The same rule applies to all x's in the following examples.

In step 206, if avg FER<FERdesired−margin1 and the average number (or ath percentile) of HARQ transmissions is <HARQnumber_desired−marginb, the system evaluates whether the current MCS level is already the highest (e.g., 64 QAM5/6) in step 206. If so, the system sets the power of the UA (PUA)=PUA−x dB. In this example, x can be selected to terminate the next HARQ transmission one step later. Otherwise, the system evaluates $\Delta SRS=\Delta SRS+x$ dB, where x, in one implementation, can be selected so that MCS=MCS+1.

If the current MCS adaptation is appropriate, the system may not change the MCS value or the UA transmission power. After performing the above evaluation, the algorithm repeats for future transmissions.

In a second implementation of the present system illustrated in FIG. 10, at the start of each new transmission a value n is initially set to 1 in step 220 and may be dynamically adjusted based on the UA QoS and performance requirements (e.g., HARQ termination statistics and FER). Then the system selects an MCS targeting 10% BLER on the nth termination in step 222, where 1<=n<=maximum number of transmissions.

In the present example, if UA OLPC is based on UA to base station path loss, the base station may determine the MCS based on the channel quality estimation of the UA to base station link plus an offset. In one example, the channel quality estimation of the UA to base station link may be performed based on existing Rel-8 mechanisms. In this example, the offset may be the coupling loss difference from the UA to base station (e.g., CeNB−Crelay). n is initially set to 1 and dynamically adjusted based on the UA QoS and performance requirements (e.g., HARQ termination statistics and FER).

Alternatively, if UA OLPC is based on the UA to RN path loss, the base station may decide the MCS based on the channel quality estimation of the UA to RN link. In this case, the RN may need to periodically send UA to RN channel related information, for example, ULSRS and PUSCH SNIR, to the base station through the wireless backhaul link so that the base station has knowledge of the UA to RN channel conditions. To save bandwidth on backhaul, channel information reports can be sent in a delta format and are only needed when such delta reaches a certain threshold.

In step 224, after each UL transmission terminates (e.g., is a success or failure), the base station updates the average number of HARQ transmissions and Frame Erasure Rate (FER). The average can be a window based moving average.

In step 226, the system evaluates whether avg FER<FERdesired−margina and the average number (or ath percentile) of HARQ transmission<HARQnumber_desired−marginb. If so, in step 228 the system evaluates whether n<maximum number of transmissions. If n<maximum number of transmissions, the system sets n=n+1. Otherwise, the system sets PUA=PUA−x dB, where x can be selected in order to terminate the next HARQ transmission one step later.

If step 230, the system evaluates whether avg FER>=FERdesired+margina or average number (or ath percentile) of HARQ transmission>=HARQnumber_desired+marginb, the system evaluates n in step 232. If so, in step 232, if n>1, the system sets n=n−1. Otherwise, the system sets PUA=PUA+x dB, where x may be selected to terminate the next HARQ transmission one step earlier.

In all other cases, the system maintains the values of n and PUA. The algorithm then repeats for future transmission.

In a third implementation of the present system illustrated in FIG. 11, in step 250 the system initially sets a value of A equal to 0.

In step 252 the system selects an MCS. If UA OLPC is based on UA to base station path loss, the base station may determine the MCS based on the channel quality estimation of the UA to base station link plus an offset. The channel quality estimation of the UA to base station link can be done based on existing Rel-8 mechanisms. The offset can be the coupling loss difference between UA and base station (e.g., CeNB−Crelay). MCSs selected in this way may be denoted as MCS'. As a result, the actual MCS used is adjusted using MCS=MCS'+A.

Alternatively, in step 252, if UA OLPC is based on the UA to RN path loss, the base station may determine the MCS based on channel quality estimation of the UA to RN link. In this example, the RN may need to periodically send UA to RN channel related information, for example, ULSRS and PUSCH SNIR, to the base station through the wireless backhaul link so that the base station has knowledge of the UA to RN channel conditions. To save bandwidth on backhaul, channel information reports can be sent in a delta format and may only be needed when such delta reaches a certain threshold. In this example, let MCS selected in this way be denoted as MCS'. As a result, the actual MCS used is adjusted using MCS=MCS'+A.

In step 254, after each UL transmission terminates (success or failure), the base station updates the average number (or ath percentile) of HARQ transmissions and average Frame Erasure Rate (FER). The average can be a window based moving average.

In step 256 the system evaluates whether avg FER<FERdesired−margina or the average number of HARQ transmission<HARQnumber_desired−marginb. If avg FER<FERdesired−margina or average number of HARQ transmissions is <HARQnumber_desired−marginb, in step 258, if the current MCS is already the highest, the system sets PUA=PUA−x dB, where x can be selected to decrease the HARQ termination one step earlier. Otherwise the system increases the next new MCS by one level (e.g., A=1).

If step 260 the system evaluates whether avg FER>=FERdesired+margina or average number of HARQ transmissions>=HARQnumber_desired+marginb. If avg FER>=FERdesired+margina or average number of HARQ transmission>=HARQnumber_desired+marginb, in step 262, if the current MCS is already the lowest, the system sets PUA=PUA+x dB, where x can be selected to decrease the HARQ termination one step earlier. Otherwise, the system reduces the next new MCS by one level (e.g., A=−1).

In all other cases, PUA is unchanged and A is set to 0 in step 264.

Figure 12:
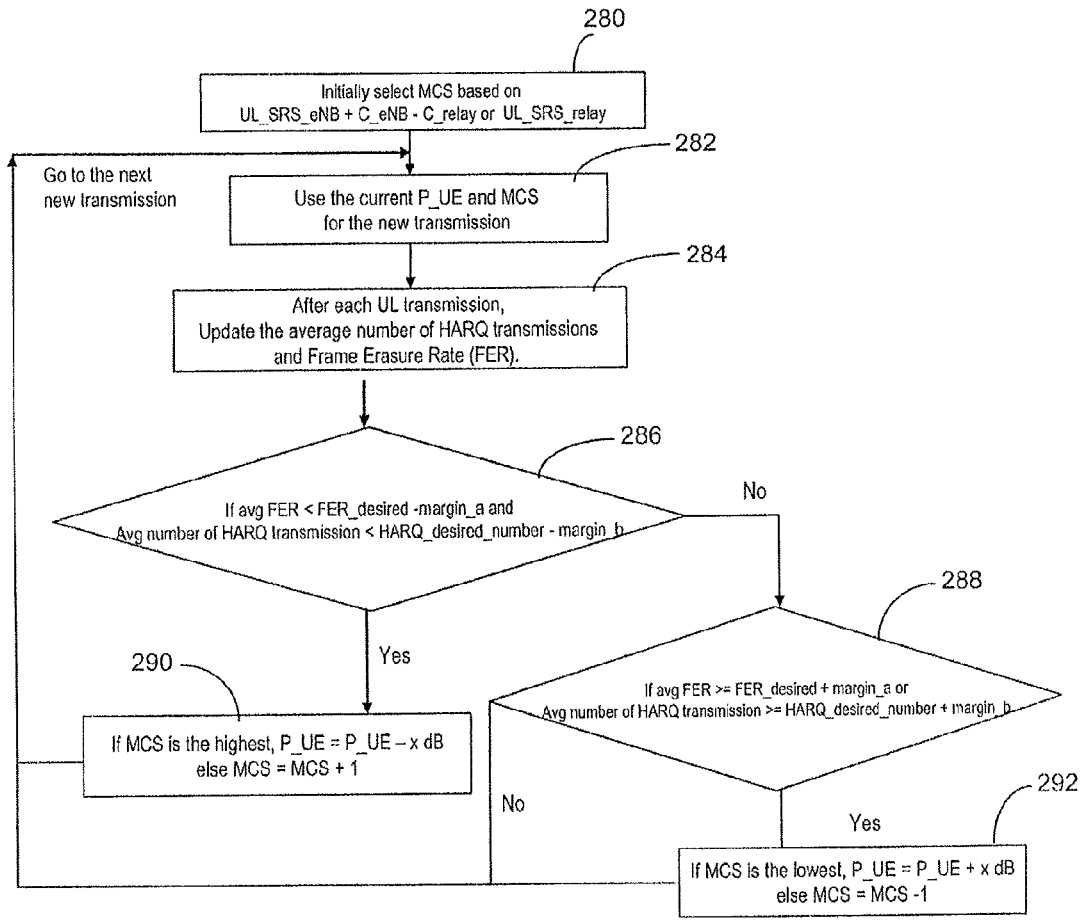

In a fourth implementation of the present system illustrated in FIG. 12, the system initially selects an MCS in step 280.

In step 280, if UA OLPC is based on UA to base station path loss, the system may select an MCS based on channel quality estimation from UL SRS received using the UA to base station link (e.g., ULeNB_Q, plus an offset). The offset can be the coupling loss difference between the UA to base station link and the UA to RN link+ΔSRS (e.g., CeNB−Crelay+ΔSRS). ΔSRS may be used to compensate the combined channel gain.

Alternatively, in step 280, if UA OLPC is based on the UA to RN path loss, the system selects MCS based on channel quality estimation from UL SRS received on the UA to RN link (e.g., ULrelay_Q, plus ΔSRS). ΔSRS may be defined the same way as above.

In step 282, the system is configured to use the current MCS and PUA for the new transmission. In step 284, after each UL transmission terminates (e.g., with success or failure), the base station updates the average number (or ath percentile) of HARQ transmissions and average Frame Erasure Rate (FER). The average can be a window based moving average.

In step 286 the system evaluates whether average FER<FERdesired−margina and average number of HARQ transmission<HARQnumber_desired−marginb. If so, in step 290, if the current MCS is already the highest, the system sets PUA=PUA−x dB, where x can be selected to decrease the HARQ termination one step earlier. Otherwise, the system sets MCS=MCS+1.

In step 288, the system evaluates whether avg FER>=FERdesired+margina or the average number of HARQ transmissions>=HARQnumber_desired+marginb. In step 292, if the current MCS is already the lowest, the system sets PUA=PUA+x dB, where x can be selected to decrease the HARQ termination one step earlier. Otherwise, the system sets MCS=MCS−1.

In all other cases, MCS and PUA are unchanged. The algorithm then repeats for the next new transmissions.

Figure 13:
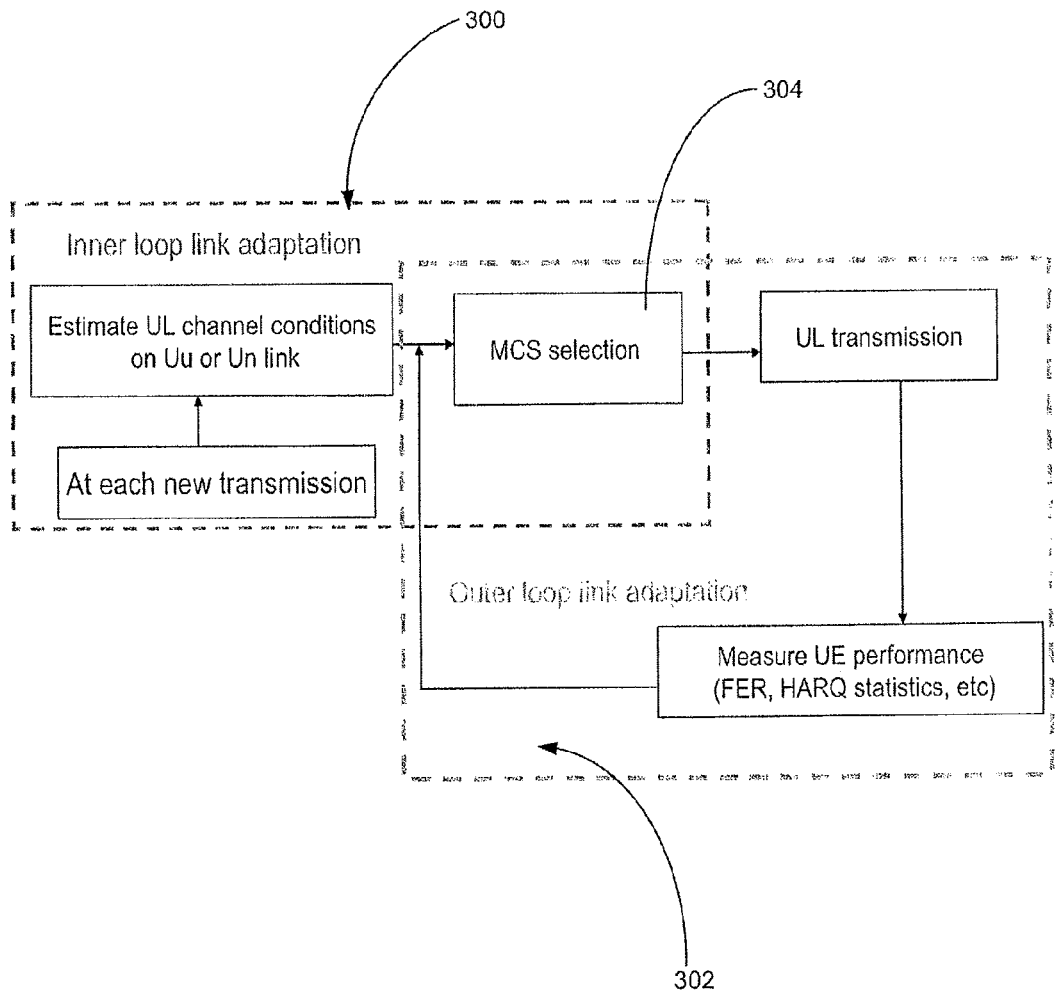
FIG. 13 illustrates the various network entities that participate in inner loop and outer loop link adaptation algorithms of FIGS. 8-11.

FIG. 13 illustrates the various network entities that participate in inner loop and outer loop link adaptation as described in FIGS. 9-12. In FIG. 13, the first three implementations of the present system illustrated in FIGS. 9-11 have two loops for link adaptation. Inner loop adaptation 300 is based on uplink channel quality estimation and the adaptation pace is relatively quick. Outer loop adaptation 302 is based on long term UA QoS measurements and the adaptation pace is slower than inner loop adaptation 300 to capture the combined channel gain. For the fourth implementation illustrated in FIG. 12, channel quality estimation is only used in the initial MCS selection 304. In that case, MCS adaptation may be based on the long term statistics such as average number of HARQ transmission and average number of FER. Because no inner loop 300 adaptation is used in the fourth proposal, the link adaptation may not be fast and effective enough to capture the fast fading variations. In some cases, proposals one through three (FIGS. 9-11) may require more channel quality estimation feedback, but may lead to better channel utilization and better link adaptation stability.

Figure 14:
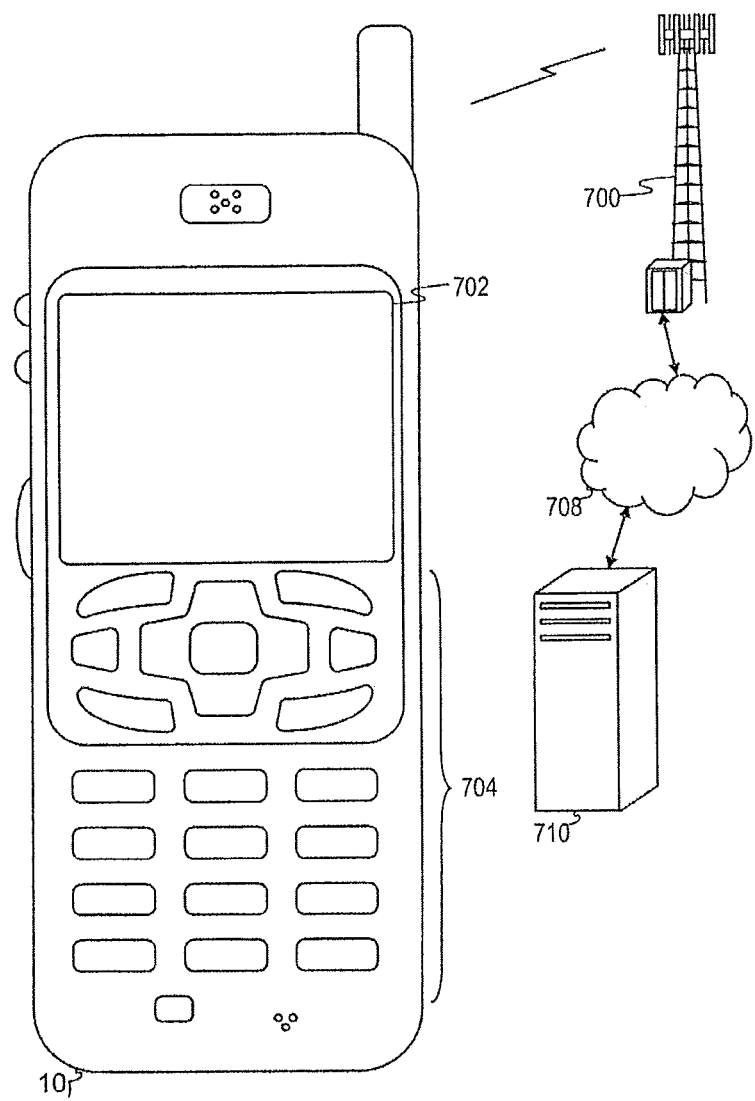
FIG. 14 is a diagram of a wireless communications system including a UA operable for some of the various embodiments of the disclosure.

FIG. 14 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 15:
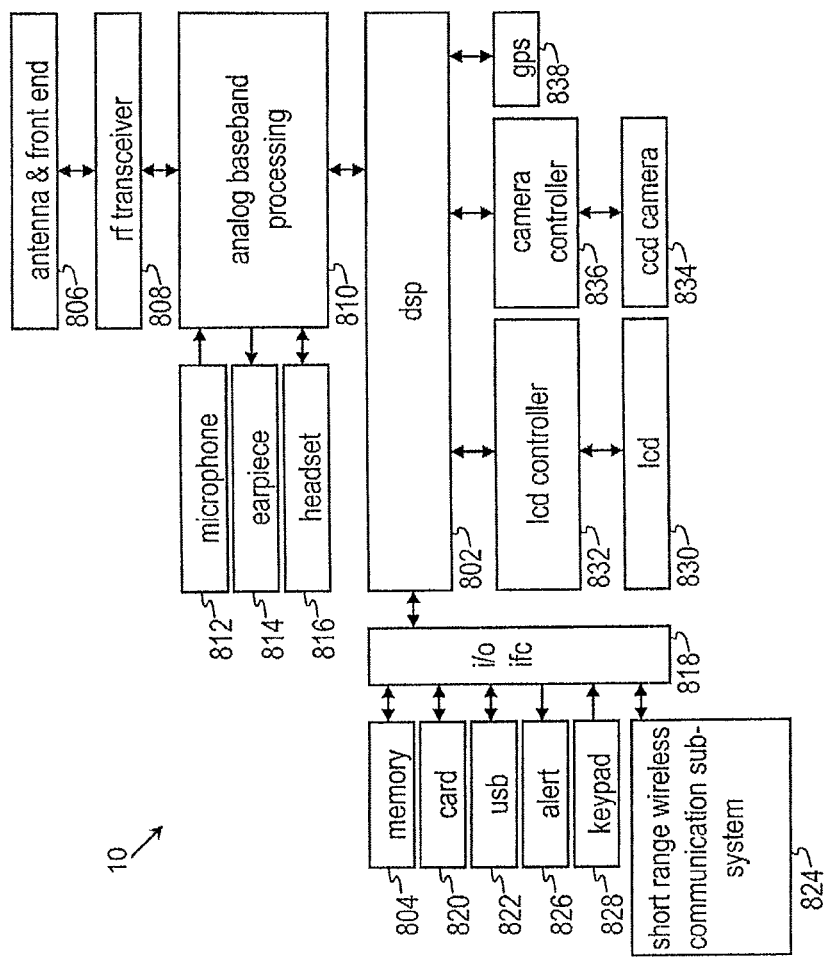
FIG. 15 is a block diagram of a UA operable for some of the various embodiments of the disclosure.

FIG. 15 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog base band processing unit 810 may provide various analog processing of inputs and outputs, for example analog processing of inputs from the microphone 812 and the headset 816 and outputs to the earpiece 814 and the headset 816. To that end, the analog base band processing unit 810 may have ports for connecting to the built-in microphone 812 and the earpiece speaker 814 that enable the UA 10 to be used as a cell phone. The analog base band processing unit 810 may further include a port for connecting to a headset or other hands-free microphone and speaker configuration. The analog base band processing unit 810 may provide digital-to-analog conversion in one signal direction and analog-to-digital conversion in the opposing signal direction. In some embodiments, at least some of the functionality of the analog base band processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 16:
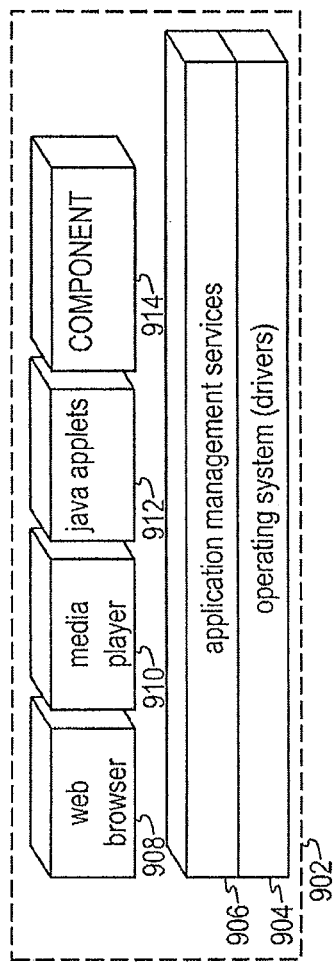
FIG. 16 is a diagram of a software environment that may be implemented on a UA operable for some of the various embodiments of the disclosure.

FIG. 16 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services (AMS) 906 that transfer control between applications running on the UA 10. Also shown in FIG. 16 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audiovisual media. The Java applets 912 configure the UA 10 to provide games, utilities, and other functionality. A component 914 might provide functionality described herein.

Figure 17:
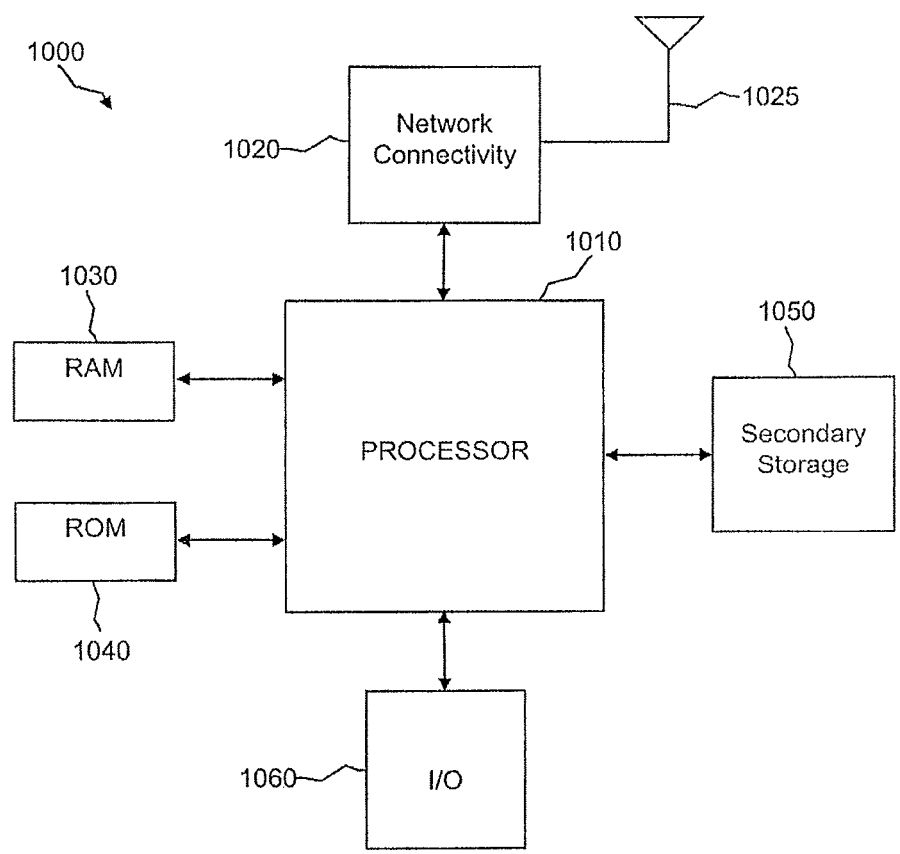
FIG. 17 is an illustrative general purpose computer system suitable for some of the various embodiments of the disclosure.

The UA 10, base station 120, and other components described above might include a processing component that is capable of executing instructions related to the actions described above. FIG. 17 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this invention, the following claims are made:

The invention claimed is:

1. A method for allocating resources of a wireless communication system, the method including:
   determining power levels of downlink (DL) communication channels between a base station and a user agent (UA) and between each of a plurality of relay nodes (RNs) and the UA;
   determining coupling losses of uplink (UL) communication channels between the base station and the UA and between each of the plurality of RNs and the UA; and
   when the power level of the DL communication channel between the base station and the UA is greater than the power levels of the DL communication channels between each of the plurality of RNs and the UA, and the coupling losses of the UL communication channel between at least one of the RNs and the UA are less than the coupling losses of the UL communication channel between the base station and the UA:
     allocating a DL communication channel resource on the base station to the UA, and
     allocating a UL communication channel resource on the at least one of the plurality of RNs to the UA.

2. The method of claim 1, including, when the power level of the DL communication channel between the base station and the UA is less than the power level of the DL communication channel between at least one of the plurality of RNs and the UA, and the coupling losses of the UL communication channels between each of the RNs and the UA are greater than the coupling losses of the UL communication channel between the base station and the UA:
   allocating a DL communication channel resource on the at least one of the plurality of RNs to the UA, and
   allocating a UL communication channel resource on the base station to the UA.

3. The method of claim 1, wherein the base station is an evolved universal terrestrial radio access network (E-UTRAN) node B (eNB).

4. The method of claim 1, wherein determining power levels of DL communication channels between the base station and the UA and between each of the plurality of RNs and the UA includes:
   receiving a Sounding Reference Signal (SRS); and
   using the SRS to determine a power level of a DL communication channel between at least one of the base station and the UA and one of the plurality of RNs and the UA.

5. The method of claim 1, including using a margin to modify a value of at least one of the power levels and the coupling losses.

6. A method for allocating resources of a wireless communication system, the method including:
   receiving sounding reference signals (SRSs) from at least one of a UA and a plurality of relay nodes (RNs), the SRSs describing power levels of uplink (UL) communication channels between the UA and a base station and between the UA and each of the plurality of RNs;
   when a power level of a UL communication channel between the UA and at least one of the plurality of RNs is greater than the power level of the UL communication channel between the UA and the base station, identifying one of the RNs having the UL communication channel with the greatest power level out of the plurality of RNs;
determining a receiving power of the UA from the base station and a receiving power of the UA from one of the plurality of RNs; and
when the receiving power of the UA from the base station is greater than the receiving power of the UA from one of the plurality of RNs:
allocating UL communication channel resources on both the base station and the one of the plurality of RNs to the UA, and
allocating a downlink (DL) communication channel resource on the base station to the UA.

7. The method of claim 6, wherein the base station is an evolved universal terrestrial radio access network (E-UTRAN) node B (eNB).

8. The method of claim 6, including using a margin to modify a value of at least one of the power levels and the receiving powers.

9. A base station for allocating resources of a wireless communication system, the base station comprising:
a processor, the processor being configured to:
determine power levels of downlink (DL) communication channels between the base station and a user agent (UA) and between each of a plurality of relay nodes (RNs) and the UA;
determine coupling losses of uplink (UL) communication channels between the base station and the UA and between each of the plurality of RNs and the UA; and
when the power level of the DL communication channel between the base station and the UA is greater than the power levels of the DL communication channels between each of the plurality of RNs and the UA, and the coupling losses of the UL communication channel between at least one of the RNs and the UA are less than the coupling losses of the UL communication channel between the base station and the UA:
allocate a DL communication channel resource on the base station to the UA; and
allocate a UL communication channel resource on the at least one of the plurality of RNs to the UA.

10. The base station of claim 9, wherein the processor is further configured to, when the power level of the DL communication channel between the base station and the UA is less than the power level of the DL communication channel between at least one of the plurality of RNs and the UA, and the coupling losses of the UL communication channels between each of the RNs and the UA are greater than the coupling losses of the UL communication channel between the base station and the UA:
allocate a DL communication channel resource on the at least one of the plurality of RNs to the UA; and
allocate a UL communication channel resource on the base station to the UA.

11. The base station of claim 9, wherein the base station includes an evolved universal terrestrial radio access network (E-UTRAN) node B (eNB).

12. The base station of claim 9, wherein the processor is further configured to:
receive a Sounding Reference Signal (SRS); and
use the SRS to determine a power level of a DL communication channel between at least one of the base station and the UA and one of the plurality of RNs and the UA.

13. The base station of claim 9, wherein the processor is further configured to use a margin to modify a value of at least one of the power levels and the coupling losses.

14. A base station for allocating resources of a wireless communication system, the base station comprising:
a processor, the processor being configured to:
receive sounding reference signals (SRSs) from at least one of a user agent (UA) and the plurality of relay nodes (RNs), the SRSs describing power levels of uplink (UL) communication channels between the UA and the base station and between the UA and each of a plurality of RNs;
when a power level of a UL communication channel between the UA and at least one of the plurality of RNs is greater than the power level of the UL communication channel between the UA and the base station, identify one of the RNs having the UL communication channel with the greatest power level out of the plurality of RNs;
determine a receiving power of the UA from the base station and a receiving power of the UA from one of the plurality of RNs; and
when the receiving power of the UA from the base station is greater than the receiving power of the UA from one of the plurality of RNs:
allocate UL communication channel resources on both the base station and the one of the plurality of RNs to the UA, and
allocate a downlink (DL) communication channel resource on the base station to the UA.

15. The base station of claim 14, wherein the base station includes an evolved universal terrestrial radio access network (E-UTRAN) node B (eNB).

16. The base station of claim 14, wherein the processor is further configured to use a margin to modify a value of at least one of the power levels and the transmission powers.

17. A wireless communication system, comprising:
a plurality of relay nodes (RNs), the RNs being configured to communicate with at least one of the base station and a user agent (UA); and
a base station, the base station being configured to:
determine power levels of downlink (DL) communication channels between the base station and the UA and between each of the plurality of RNs and the UA;
determine coupling losses of uplink (UL) communication channels between the base station and the UA and between each of the plurality of RNs and the UA; and
when the power level of the DL communication channel between the base station and the UA is greater than the power levels of the DL communication channels between each of the plurality of RNs and the UA, and the coupling losses of the UL communication channel between at least one of the RNs and the UA are less than the coupling losses of the UL communication channel between the base station and the UA:
allocate a DL communication channel resource on the base station to the UA, and
allocate a UL communication channel resource on the at least one of the plurality of RNs to the UA.

18. The system of claim 17, wherein the base station is further configured to, when the power level of the DL communication channel between the base station and the UA is less than the power level of the DL communication channel between at least one of the plurality of RNs and the UA, and the coupling losses of the UL communication channels between each of the RNs and the UA are greater than the coupling losses of the UL communication channel between the base station and the UA:
allocate a DL communication channel resource on the at least one of the plurality of RNs to the UA, and allocate a UL communication channel resource on the base station to the UA.

19. The system of claim 17, wherein the base station is an evolved universal terrestrial radio access network (E-UTRAN) node B (eNB).

20. The system of claim 17, wherein the base station is further configured to:
   receive a Sounding Reference Signal (SRS); and
   use the SRS to determine a power level of a DL communication channel between at least one of the base station and the UA and one of the plurality of RNs and the UA.

21. The system of claim 17, wherein the base station is further configured to use a margin to modify a value of at least one of the power levels and the coupling losses.

* * * * *